(12) United States Patent
Bui et al.

(10) Patent No.: US 11,968,274 B2
(45) Date of Patent: Apr. 23, 2024

(54) MULTI-ACCESS EDGE COMPUTING SLICING

(71) Applicant: Nokia Solutions and Networks Oy, Espoo (FI)

(72) Inventors: Dinh Thai Bui, Chatenay Malabry (FR); Simone Bolettieri, Pisa (IT); Raffaele Bruno, Leghorn (IT)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/977,172

(22) Filed: Oct. 31, 2022

(65) Prior Publication Data

US 2023/0140034 A1 May 4, 2023

Related U.S. Application Data

(60) Provisional application No. 63/275,913, filed on Nov. 4, 2021.

(51) Int. Cl.
  *H04L 67/51* (2022.01)
  *H04W 28/24* (2009.01)
  *H04W 48/18* (2009.01)

(52) U.S. Cl.
  CPC .............. *H04L 67/51* (2022.05); *H04W 28/24* (2013.01); *H04W 48/18* (2013.01)

(58) Field of Classification Search
  CPC ........ H04L 67/51; H04W 28/24; H04W 48/18
  (Continued)

(56) References Cited

U.S. PATENT DOCUMENTS

2018/0317134 A1\* 11/2018 Leroux ............... H04L 61/5038
2018/0332485 A1   11/2018 Senarath et al. .................... 24/2
(Continued)

FOREIGN PATENT DOCUMENTS

EP        3 684 010 A1      7/2020
WO   WO-2023003686 A1 *  1/2023

OTHER PUBLICATIONS

"3GPP TR 28.801 V15.1.0, 3$^{rd}$ Generation Partnership Project; Technical Specification Group Services and System Aspects; Telecommunication management; Study on management and orchestration of network slicing for next generation network( Release 15)", Jan. 2018, 75 pages.

(Continued)

*Primary Examiner* — Wing F Chan
*Assistant Examiner* — Leon Y Tseng
(74) *Attorney, Agent, or Firm* — Joseph C. Drish; Harrington & Smith

(57) ABSTRACT

An apparatus comprising: at least one processor; and at least one non-transitory memory storing instructions that, when executed by the at least one processor, cause the apparatus at least to: manage an application service using a management web portal; request, using the management web portal, the application service with a given service level agreement from a catalogue of offered application services; and communicate, using the management web portal, with an application service management function; wherein the application service management function is configured to translate the service level agreement of the requested application service to a specification of an application slice, and to trigger a creation of an application slice instance by contacting an application slice management function.

20 Claims, 25 Drawing Sheets

(58) Field of Classification Search
USPC .......................................................... 709/203
See application file for complete search history.

(56) References Cited

U.S. PATENT DOCUMENTS

2020/0196155 A1* 6/2020 Bogineni ............ H04L 41/0823
2022/0086864 A1* 3/2022 Sabella ............... H04L 41/0853

OTHER PUBLICATIONS

Cominardi, Luca, et al., "MEC Support For Network Slicing: Status And Limitations From A Standardization Viewpoint", IEEE Communications Standards Magazine, Jun. 2020, pp. 22-30.

"Zero-touch network and Service Management (ZSM) Landscape, Draft ETSI GR ZSM 004 V1.8.0", European Telecommunications Standards Institute, May 2021, 89 pages.

ETSI, "Multi-access Edge Computing (MEC); Support for network slicing", ETSI GR MEC 024, V2.1.1, Nov. 2019, GR MEC 024-V2.1.1-Multi-access Edge Computing (MEC); Support for network slicing (etsi.org); 28 pages, Nov. 2019.

ETSI, "Multi-access Edge Computing (MEC); Framework and Reference Architecture", ETSI MEC003, V2.2.1, Dec. 2020; GS MEC 003—V.2.2.1—Multi-access Edge Computing (MEC); Framework and Reference Architecture (etsi.org); 21 pages, Dec. 2020.

* cited by examiner

MULTI-ACCESS EDGE COMPUTING SLICING

RELATED APPLICATION

This application claims priority to U.S. Provisional Application No. 63/275,913, filed Nov. 4, 2021, which is hereby incorporated by reference in its entirety.

TECHNICAL FIELD

The examples and non-limiting embodiments relate generally to communications and, more particularly, to multi-access edge computing slicing (MEC-SLICE).

BACKGROUND

It is known to implement partition functions of logical entities in a communication network.

SUMMARY

In accordance with an aspect, an apparatus includes at least one processor; and at least one non-transitory memory storing instructions that, when executed by the at least one processor, cause the apparatus at least to: manage an application service using a management web portal; request, using the management web portal, the application service with a given service level agreement from a catalogue of offered application services; and communicate, using the management web portal, with an application service management function; wherein the application service management function is configured to translate the service level agreement of the requested application service to a specification of an application slice, and to trigger a creation of an application slice instance by contacting an application slice management function.

In accordance with an aspect, a method includes managing an application service using a management web portal; requesting, using the management web portal, the application service with a given service level agreement from a catalogue of offered application services; and communicating, using the management web portal, with an application service management function; wherein the application service management function is configured to translate the service level agreement of the requested application service to a specification of an application slice, and to trigger a creation of an application slice instance by contacting an application slice management function.

In accordance with an aspect, a non-transitory program storage device readable by a machine, tangibly embodying a program of instructions executable with the machine for performing operations is provided, the operations including: managing an application service using a management web portal; requesting, using the management web portal, the application service with a given service level agreement from a catalogue of offered application services; and communicating, using the management web portal, with an application service management function; wherein the application service management function is configured to translate the service level agreement of the requested application service to a specification of an application slice, and to trigger a creation of an application slice instance by contacting an application slice management function.

BRIEF DESCRIPTION OF THE DRAWINGS

The foregoing aspects and other features are explained in the following description, taken in connection with the accompanying drawings.

DETAILED DESCRIPTION OF EXAMPLE EMBODIMENTS

Figure 1:
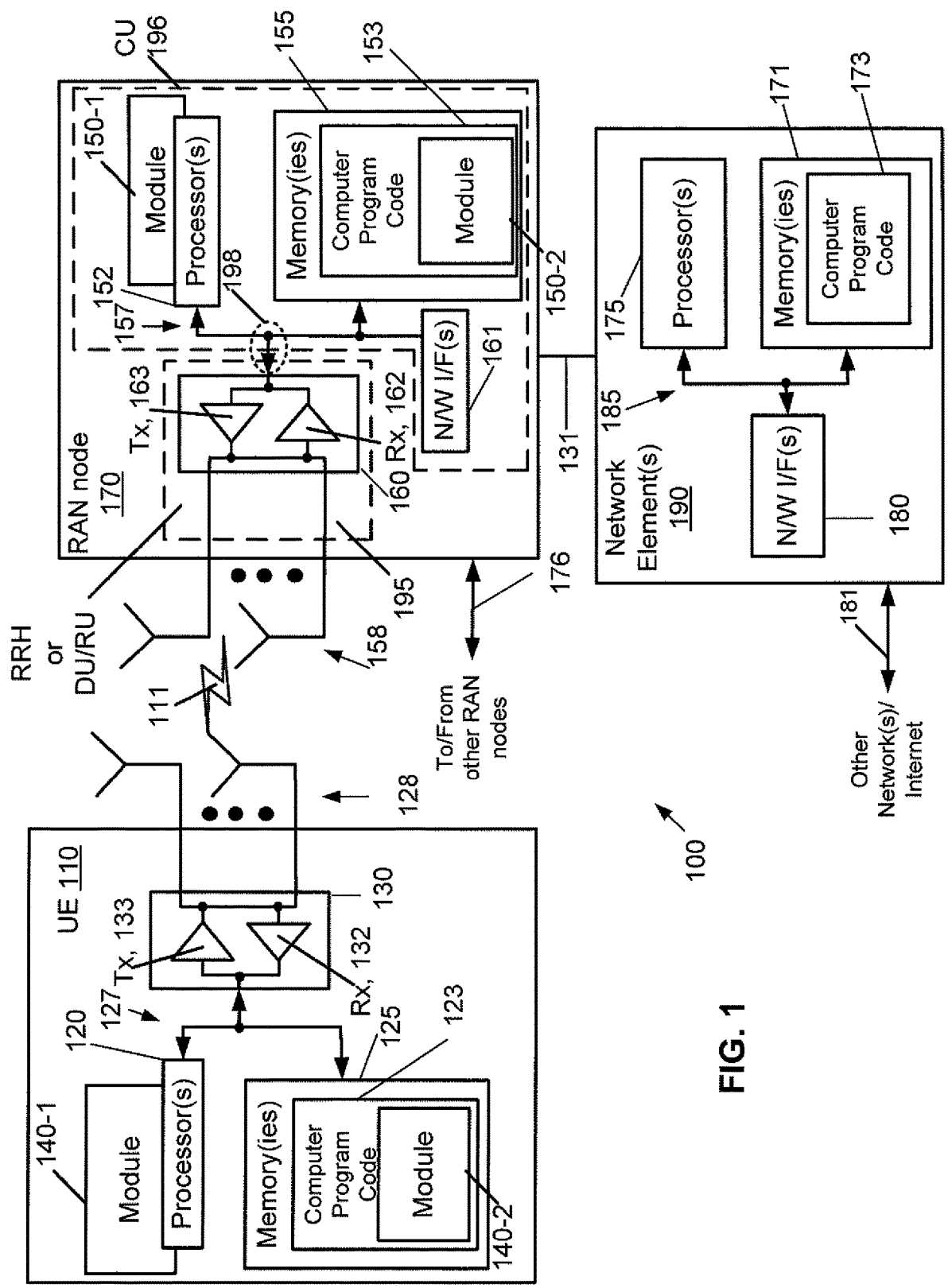
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, and one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)).

Such core network functionality for LTE may include MME (Mobility Management Entity)/SGW (Serving Gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, head mounted displays such as those that implement virtual/augmented/mixed reality, as well as portable units or terminals that incorporate combinations of such functions.

UE 110, RAN node 170, and/or network element(s) 190, (and associated memories, computer program code and modules) may be configured to implement (e.g. in part) the methods described herein, including multi-access edge computing slicing. Thus, computer program code 123, module 140-1, module 140-2, and other elements/features shown in FIG. 1 of UE 110 may implement user equipment related aspects of the methods described herein. Similarly, computer program code 153, module 150-1, module 150-2, and other elements/features shown in FIG. 1 of RAN node 170 may implement gNB/TRP related aspects of the methods described herein. Computer program code 173 and other elements/features shown in FIG. 1 of network element(s) 190 may be configured to implement network element related aspects of the methods described herein.

Having thus introduced a suitable but non-limiting technical context for the practice of the example embodiments, the example embodiments are now described with greater specificity.

Multi-access Edge Computing (MEC) allows for bringing cloud resources next to the end-user device (i.e. user equipment) in order to meet low-latency requirements of time-critical applications.

Figure 2:
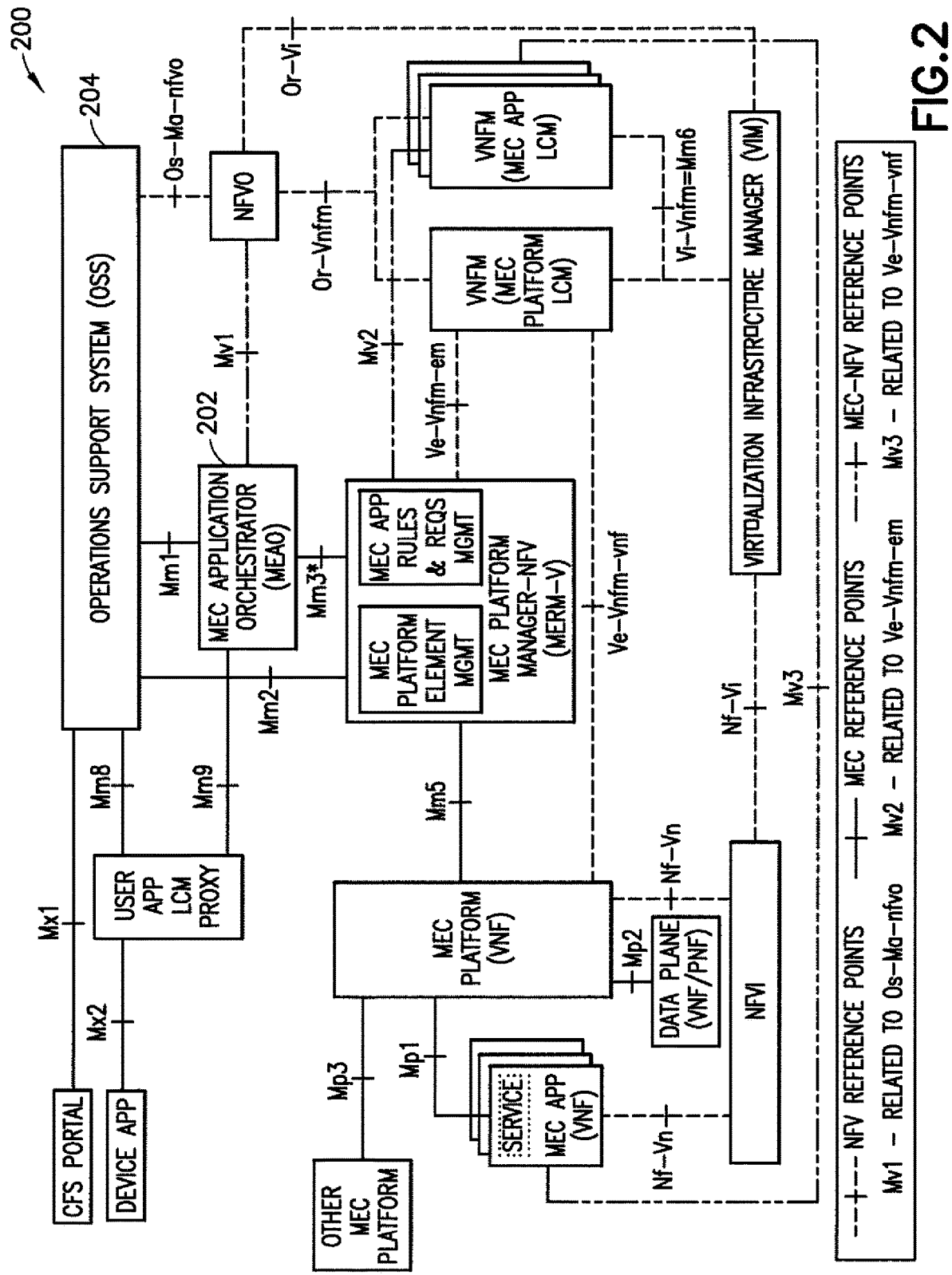
FIG. 2 is a block diagram of an ETSI reference architecture aligned with ESTI NFV.

ETSI MEC standard has specified a reference architecture 200 aligned with ETSI NFV as illustrated in FIG. 2 extracted from ETSI MEC003 V2.2.1 (2020-12). The architecture includes MEAO 202 and OSS 204.

The previous architecture 200 is not good enough as it does not allow for a multi-tenant MEC environment. More precisely, this architecture does not support network slicing as per 3GPP definition allowing for an E2E (from the UE until the application is instantiated into an edge computing platform) network slice. Such a feature allows multiple actors for sharing the same MEC infrastructure leading to cost optimization.

Figures 3, 3A:
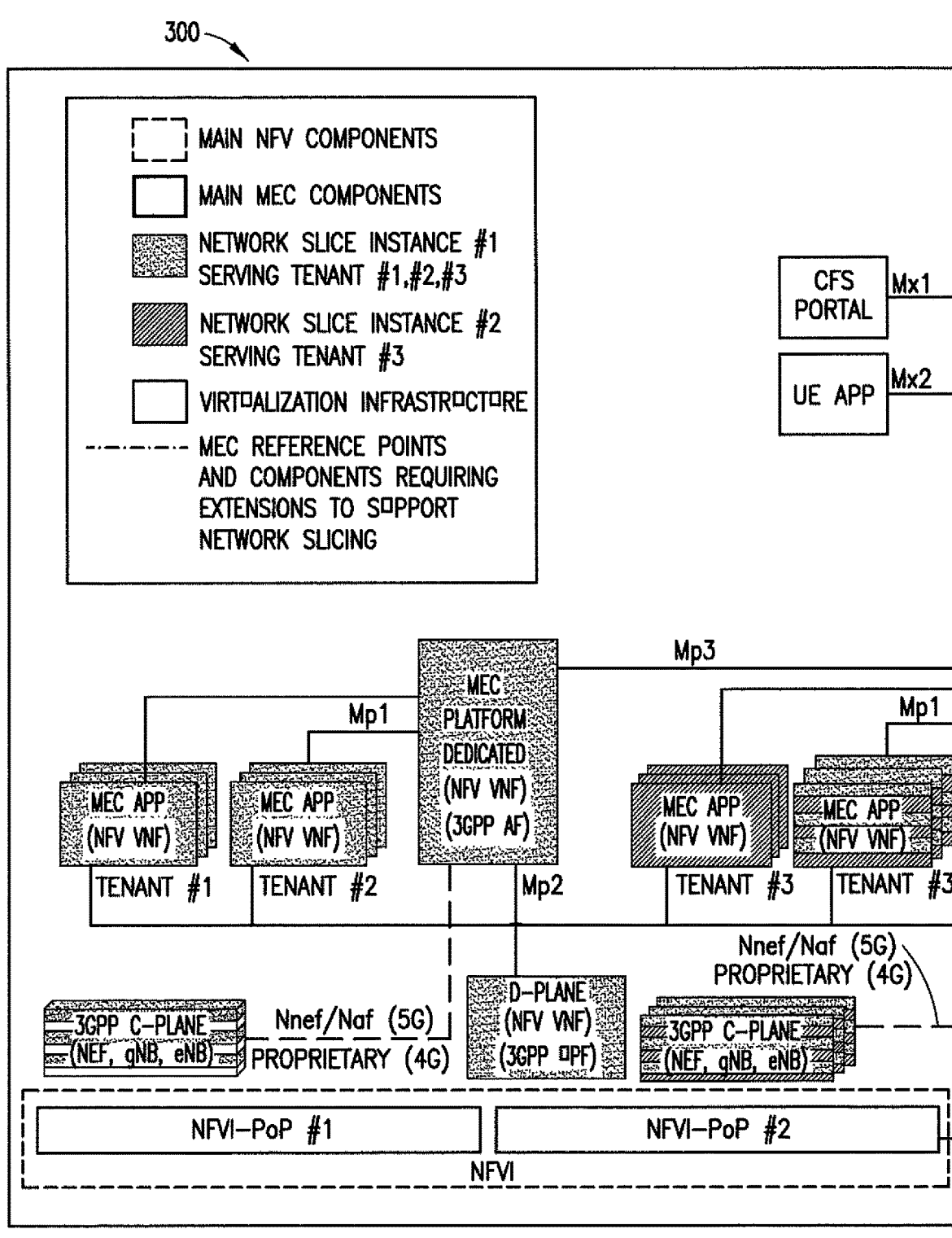
FIG. 3 (including FIG. 3A and FIG. 3B) is a block diagram of an example MEC slicing architecture.
Figure 3B:
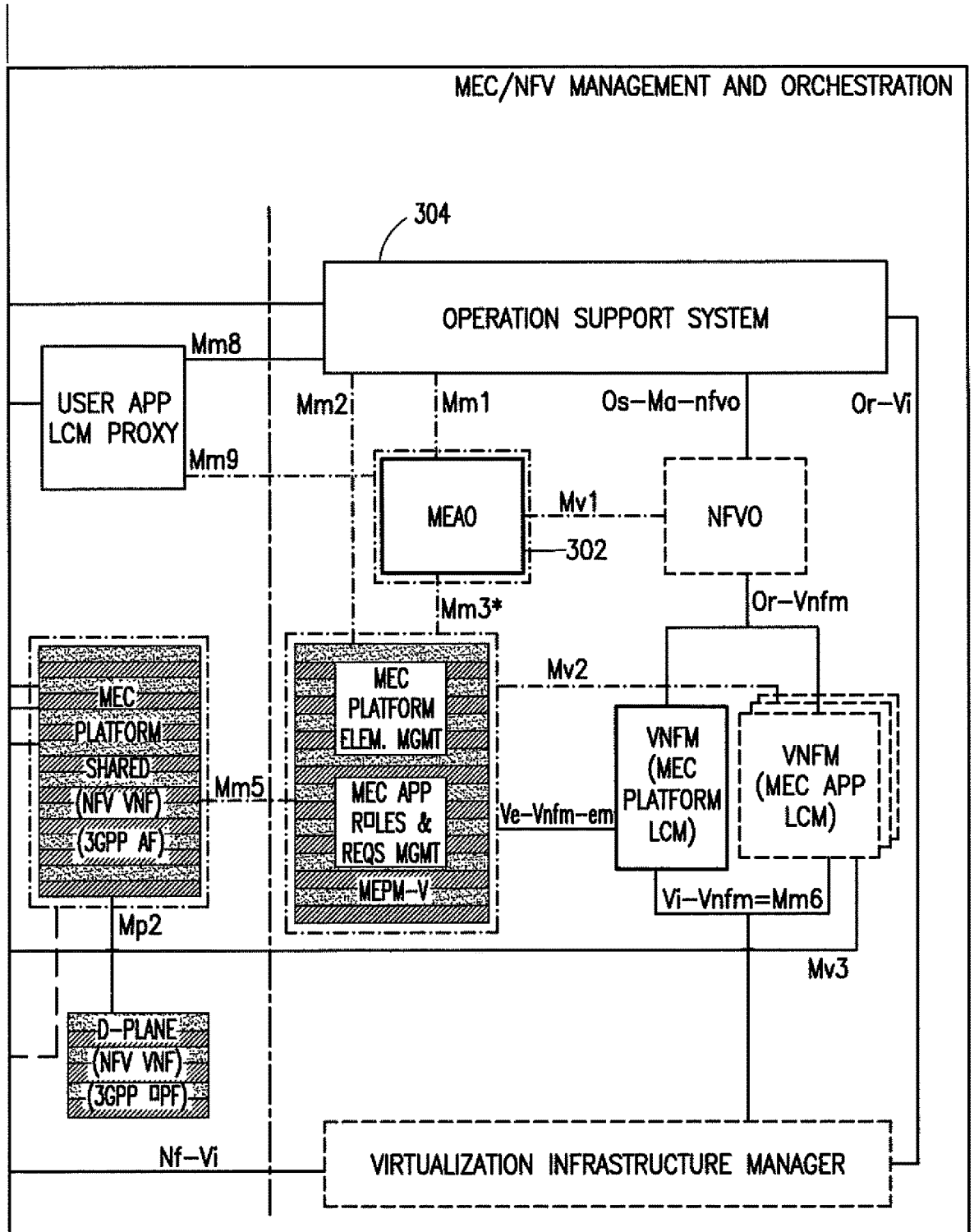

A recent study (MEC Support for Network Slicing: Status and Limitations from a Standardization Viewpoint—IEEE Communications Standards Magazine, June 2020—L. Comardi et al.), proposes to slice the MEC architecture. The proposed architecture 300 is illustrated in FIG. 3.

This architecture is still not good enough since there is one single Operation Support system (OSS) 304 and one single orchestrator (i.e. single MEAO 302) for multiple tenants. This architecture is not to be scalable as both the single OSS 304 as well as the single MEAO 302 have to manage connections to numerous devices (e.g. UEs) pertaining to different tenants. For instance, the single MEAO 302 should be aware of the tenant each UE 110 pertains to. This would create a bottleneck in terms of customer facing when dealing with UE subscription addition/modification/deletion. The scalability issue raised is not from a technical perspective (i.e. not related to monolithic versus distributed implementations) but rather from an operational, business and expertise perspective. From an operational/business perspective, the MEAO is not sliced or partitioned within the state-of-the-art. It appears to be mono-tenant. This tenant may be called the MEC Owner. In such a situation, other tenants (referred to as MEC Customers) cannot directly provision the (MEC Owner's) MEAO with their respective UE information and related policies. The MEC customers must communicate the UE information and related policies to the MEC Owner via a business channel/process which is ruled by agreed contracts. The MEC Owner needs to validate those items of information (with regards to contracts) before enforcing them onto the MEAO. It appears therefore as if the 'business interface' of the MEAO was a bottleneck. From an expertise perspective, a tenant or a MEC Customer whose role is to provide Application Services should have the expertise necessary to read the user manual of the different ACFs to deploy. This is similar to the role of a network operator who should have the required expertise to read the user manuals of network functions being deployed in his/her networks. However, application categories are tremendously larger than network function types. Some application categories may require specific expertise to integrate and to deploy. For instance, some applications for health professionals require some minimum health education to set them up correctly. It is therefore difficult to imagine a single MEC Owner entity setting up and deploying applications for all the different categories of applications. Without a direct access to the MEAO, this would mean the different MEC Customers should provide these fine-grain settings to the MEC Owner via the aforementioned business process/channel which appears to hinder the deployment speed.

Figure 4:
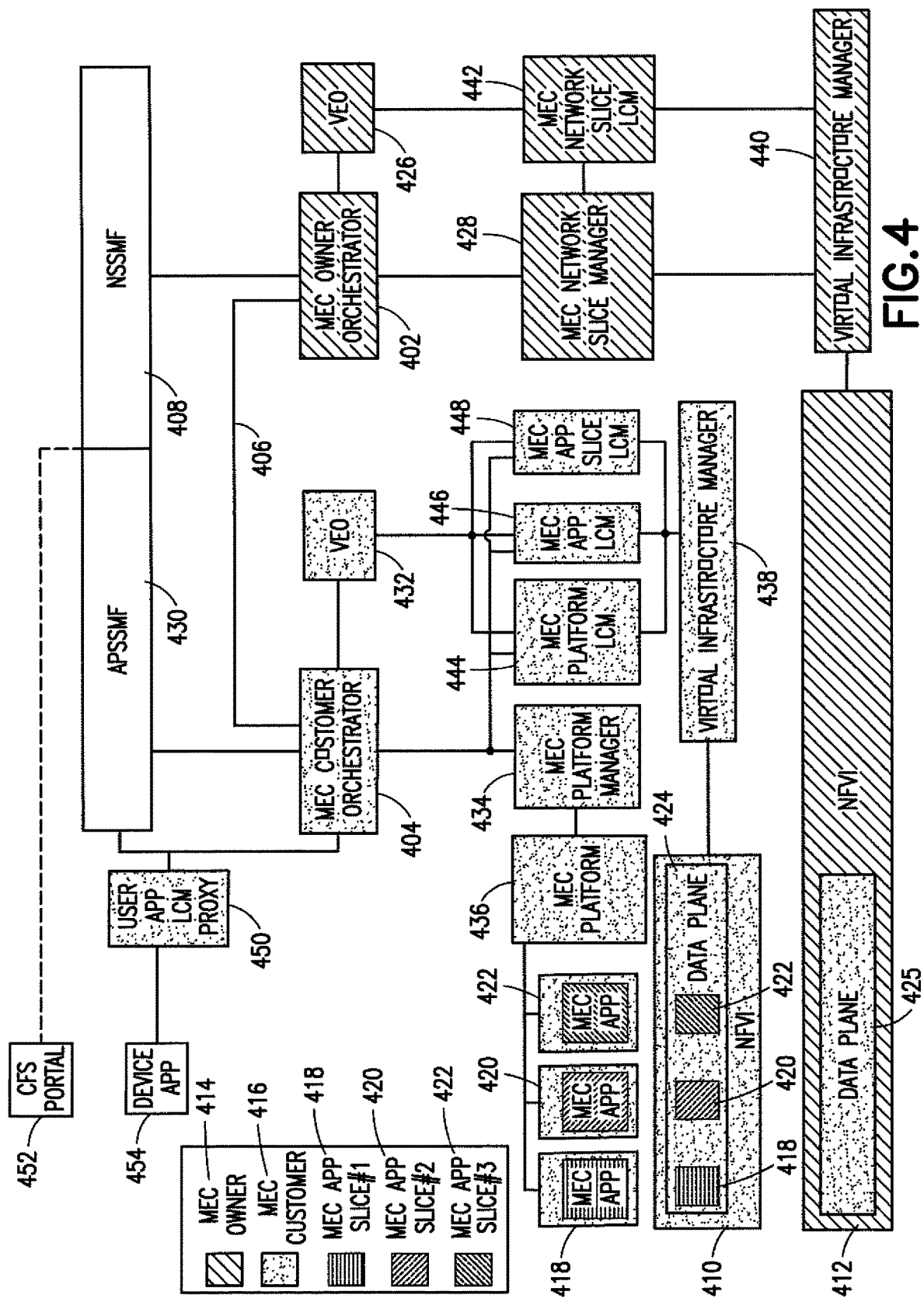
FIG. 4 is a block diagram of an example MEC nested slicing architecture.

Accordingly, the idea as described herein consists of splitting the MEAO 302 (referring also to MEAO 202) into two with separate responsibilities. The new general architecture is illustrated in FIG. 4.

The MEC (Infrastructure) Owner Orchestrator (MEC-OO) 402 is responsible for orchestrating and managing the MEC Owner's Network Slice Subnet dedicated to each tenant. The MEC Tenant/Customer Orchestrator (MEC-CO) 404 is responsible for orchestrating and managing resources within the MEC Tenant's Network Slice Subnet. The MEC Tenant/Customer Orchestrator (MEC-CO) 404 could further partition those resources into smaller slices called in this description as Application Slices (APS—these could be also called as Network Slices but Application Slices is used for clarity). A communication interface 406 is established between the two Orchestrators (402, 404) in order to synchronize in terms of resources regarding a Tenant's Network Slice Subnet, but also in terms of forwarding rules (those managed by the MEC-CO 404 and those managed by the MEC-OO 402).

In terms of management, each Tenant's Network Slice Subnet can be managed by the Tenant's NSSMF 408 (Network Slice Subnet Management Function as per 3GPP definition). Similarly, each Tenant's Application Slice can be managed by the Tenant's new building block called Application Slice Management Function (APSMF) which delegates the life-cycle management of constituent Application Slice Subnets (APSS) to a different domain Application Slice Subnet management Function (APSSMF). The latter is also a new management building block to manage an Application Component Function (ACF).

The MEC reference architecture is split into two responsibility domains with one of them managed and orchestrated by the MEC Owner 414 and the other by the MEC Customer 416. The MEC Owner 414 plays both Hardware supplier and NFVI supplier roles (with reference to 412 and possibly 410). The MEC Owner 414 provides MEC network slices to the MEC Tenant also referred to as the MEC Customer 416. The MEC Customer 416 is a Tenant with at least a dedicated MEC network slice. The MEC Customer 416 plays the role of a MEC operator with all standard MEC components and interfaces as per ETSI MEC003.

This dichotomy allows a single MEC Owner's infrastructure to host multiple MEC Customers (i.e. multiple tenants) with each of them having its own MEC network slice (i.e. its dedicated data plane (424, 425) provided by the MEC Owner 414) with related management capability. In turn, each MEC Customer 416 manages and orchestrates his/her own MEC application slices.

Implementation-wise, this is made possible using the nested virtualization capability of the infrastructure. For instance, the MEC Customer 416 can deploy Virtual Machines (VMs) within VMs provided by the MEC Owner 414. Alternatively, the MEC Customer 416 could deploy containers (e.g. Docker containers) within the latter VMs.

The MEC Owner Orchestrator (MEC-OO) 402 receives from the MEC NSSMF 408 (see "Management Hierarchy" sub-section below for more detail) orders to create, modify or delete MEC network slices. The MEC Owner Orchestrator (MEC-OO) 402 collaborates with the MEC Owner VEO 426 (MEC-OVEO—e.g. OpenStack Heat, NFVO) to manage such network slice life-cycle, which may be performed together with MEC network slice LCM 442. For simplicity, this description considers that the MEC Customer 416 is provided a dedicated network slice as per {Cominardi2020}. For instance, the MEC Owner 414 provides to the MEC Customer 416 with a dedicated Kubernetes cluster connected to the 5G Core (5GC) via a dedicated data plane slice. The MEC-OO 402 also collaborates with the MEC Network Slice Manager 428 to manage the network slice data plane parameters. For instance, the MEC Network Slice Manager 428 could behave like a 3GPP Application Function (AF) which interacts with the 5GC to synchronize data plane forwarding rules to realize local breakout regarding MEC application traffics.

The MEC Customer Orchestrator (MEC-CO 404) receives from the MEC APSSMF 430 (see "Management Hierarchy" sub-section below for more detail) orders to create, modify or delete MEC application slices. The MEC Customer Orchestrator (MEC-CO 404) collaborates with the MEC Customer VEO 432 (MEC-CVEO—e.g. K8S) to manage such MEC application slice life-cycle, which may be performed together with MEC platform LCM 444, MEC app LCM 446, and/or MEC app slice LCM 448. The MEC-CO 404 via the MEC-CVEO 432 provides compute, storage and network resources to each MEC application slice. The MEC-CO 404 also collaborates with the MEC Customer Platform Manager (MECPM) 434 to manage an ETSI MEC Platform 436 instance (e.g. embodied as a Docker container).

In order to stitch the MEC application slice data plane to the MEC network slice data plane, the MEC-OO 402 creates gateways that it communicates to the MEC-CO 404.

Regarding interaction with the 5GC, each MEC Platform 436 (MEP—within the MEC Customer's responsibility domain 416) could play the role of a 3GPP Application Function (AF) and interact with the 5GC to influence 5G traffic from/and towards MEC applications. Alternatively, the MEC Owner's MEC Network Slice Manager (MENSM) 428 can play the role of an AF. The MEC Network Slice Manager 428 could interact with the 5GC to influence 5G traffic from/to MEC applications on behalf of the MEC Customer. In this case, the MEP 436 could delegate the 5GC traffic influence (i.e. enforce new 5GC forwarding rules or tear down old ones) to the MENSM 428 either via a direct link or via the MEC-CO-to-MEC-OO link 406.

Among the new building blocks identified include the MEC Customer Orchestrator 404, the MEC Owner Orchestrator 402, the MEC Network Slice manager 428, an Interface 406 between the MEC Customer Orchestrator 404 and the MEC Owner Orchestrator 402, and an Interface between the (MEC Customer) MEC Platform Manager 434 and the (MEC Owner) MEC Network Slice Manager 428, possibly via the previously listed interface 406, namely the Interface 406 between the MEC Customer Orchestrator 404 and the MEC Owner Orchestrator 402.

In FIG. 4, items within the MEC Owner domain 414 include MEC Owner Orchestrator 402, VEO 426, MEC network slice manager 418, MEC network slice LCM 442, virtual infrastructure manager 440, and NFVI 412.

In FIG. 4, items within the MEC customer domain 416 include User app LCM proxy 450, MEC customer orchestrator 404, VEO 432, MEC application slice #1 418, MEC application slice #2 420, MEC application slice #3 422, MEC platform 436, MEC platform manager 434, MEC platform LCM 444, MEC application LCM 446, MEC application slice LCM 448, virtual infrastructure manager 438, NFVI 410, data plane 424 within NFVI 410, and data plane 425 within NFVI 412.

FIG. 4 also shows that data plane 424 within NFVI 410 comprises an instance of each of the MEC application slice #1 418, MEC application slice #2 420, and MEC application slice #3, 422. Also shown in CFS portal 452 and device application 454. One or multiple application slices can be provided by the MEC Customer as an ASP (Application Service Provider) to an ASC (Application Service Consumer).

Management Hierarchy:

Definitions include the following for NF, VNF, and the application component function (ACF).

NF (3GPP definition): "a functional block within a network infrastructure that has well-defined external interfaces and well-defined functional behavior."

VNF (3GPP definition): "an implementation of a Network Function using virtualization techniques offered by the Network Function Virtualization Infrastructure (NFVI)."

Application Component Function (ACF): is the atomic data-processing component of an (MEC) application which presents well-defined external interfaces and Application Programmable Interfaces (APIs) and well-defined functional behavior (e.g. Docker container).

Since VNF and ACF are designed with different purposes, it is not sensible to use 3GPP-defined CSMF to manage Application Services (ASs) built from ACFs. Indeed, 3GPP-defined CSMF is essentially specified to manage Communication Services (CSs) which do not have the same SLA framework as ASs. For instance, data backup is the main concern for SLA within AS context while it is not part of CS SLA.

Similarly to CSs, ASs can be nested. For instance, an Application Consumer (ASC) A uses face recognition Application Service from Application Service Provider (ASP) B. It adds ACFs which retrieve video stream from customers' cameras and ACFs which take control of customers' doors to build a new AS which provides automatic door opening based on face recognition. ASC A then becomes ASP A selling the previous new AS to customers such as house/apartment rental platforms.

Similarly to a Network Slice built upon a set of VNFs, this document coins the concept of Application Slice (APS) which is built upon a non-empty set of ACFs and, possibly, on or more VNFs.

Figure 5:
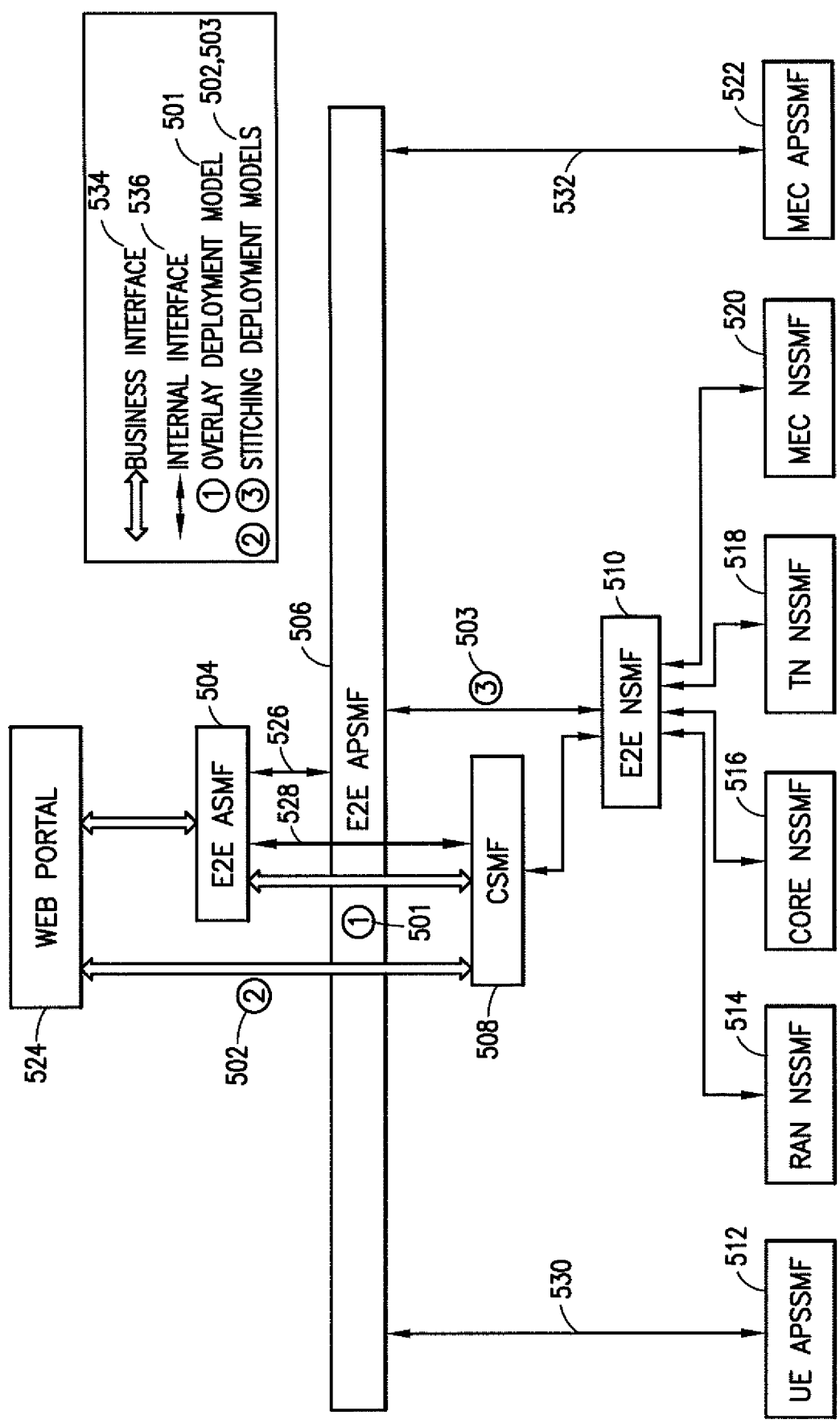
FIG. 5 is a block diagram of an overall management architecture.

By extending the 3GPP overall management architecture to an Application Slice, it is possible to have an overall management architecture as shown in FIG. 5.

A user can manage its AS and possibly related NSs via a management Web Portal 524. The user can request an application service (AS) with a given SLA from a catalogue of offered ASs. The business interaction of the web portal 524 can happen in two manners depending on the AS/APS deployment models that is used in the system. In both cases, the web portal 524 communicates with a new management function, called Application Service Management Function (ASMF) 504, which is responsible for translating the SLA of the requested AS to the specification of an application slice (APS) and to trigger the creation of the APS instance by contacting a new management function called Application Slice Management Function (APSMF) 506. The APSMF 506 splits the APS into multiple subnets, one for each domain over which the requested APS spans, including possibly the network and the AS's endpoints, namely the UE requesting the AS, and the edge system instantiating the AS. To this end, introduced herein is the new Application Slice Subnet Management Function (APSSMF), which applies the APSS life-cycle management commands within the two potential domains that are relevant for an application slice subnets, namely the UE 512 and the MEC 522.

In the overlay model (label 1 501), the E2E ASMF 504 is also responsible for translating the E2E AS SLA into E2E CS SLA and for requiring the adapted E2E CS from the CSMF 508.

In one of the stitching models (label 2 502), the web portal 524 (expert user) is also responsible for breaking the E2E AS SLA into two separate and independent SLAs. The first is related to the E2E CS that the E2E ASMF 504 requests from the CSMF 508. The second SLA is restricted to the AS endpoints, namely the UE and the MEC, and we can refer to it as EP AS SLA.

Alternatively (label 3 503), the web portal 524 (non-expert user) does not need to perform the aforementioned E2E AS SLA splitting. In this stitching model, the APSMF 506 is responsible to communicate directly with the NSMF 510 to manage the network slice subnets associated with the APS.

Finally, the management of network slice via the NSMF 510 and the one of per-domain network slice subnets via NSSMFs are well-defined by 3GPP, and they do not need to be extended (Cf. 3GPP TS 28.531, 3GPP TS 28.541). Also shown in FIG. 5 is the RAN NSSMF 514, the core NSSMF 516, the TN NSSMF 518, and the MEC NSSMF 520.

Among the new building blocks identified include the ASMF 504, the APSMF 506, the APSSMFs 512 and 522, the Interface 528 between ASMF 504 and CSMF 508, the Interface 526 between ASMF 504 and APSMF 506, and the Interface 530, 532 between APSMF 506 and APSSMF (512, 522).

An advantage and technical effect of the examples described herein include that the general architecture allows for separating/isolating tenant-dedicated MEC orchestration work. This leads to a more scalable orchestration solution. A further advantage and technical effect of the examples described herein include that the architecture supports hierarchical MEC slicing as an MEC Owner (provider of physical servers) that can slice its infrastructure to serve multiple independent MEC Customers, who in turn can independently orchestrate allocated resources to their tenants. Nested virtualization technologies can enable such a nested-slicing architecture. A further advantage and technical effect of the examples described herein is providing an associated overall management architecture.

Within an MEC infrastructure, the examples described herein may be implemented with two MEC Orchestrators belonging to different administration domains with one domain (MEC Owner) providing MEC hosts to the other (MEC Customer).

Accordingly, the examples described herein relate to multi-access edge computing application slice architecture and proof-of-concept.

Amongst different design focuses, 5G standards have worked on low-latency requirements, which work caters to safety-critical and mission-critical applications. Industrial automation within Industry 4.0 is an example of new perspectives that are triggered by such a new capability. To reach low-latency targets, the 5G New Radio (NR) standard has defined the Ultra-Reliable Low Latency Communication (URLLC) which allows for reaching a few ms one-way latency with small radio frames. To further improve end-to-end latency, the 5G architecture has integrated distributed cloud infrastructures, namely the Multi-access Edge Computing (MEC), which allows for bringing cloud resources next to the end-user device.

Another important pillar of the 5G standards is the network slice concept which allows for sharing the same 5G infrastructures amongst different usages. This aims at maximizing 5G operator revenue. An end-to-end network slice framework taking into account the transport network has been proposed by [ETSI, Zero-touch network and service management (zsm); end-to-end management and orchestration of network slicing, Group Specification ETSI GS ZSM 003 V1.1.1, ETSI ISG ZSM (06 2021)]. There are several definitions of a network slice, but it has been agreed that a network slice is a logical network composed of dedicated and shared network resources and that there is isolation between network slice instances at different levels namely at the data plane, the control plane and the management plane.

As latency should be managed end-to-end, there is a need to establish and manage an end-to-end network slice including the MEC. There are also proposals to start such an integration. However, still missing is a complete architecture which allows for taking into account processing and storage latency within the MEC. This architecture should also include the overall slice management building block.

The examples described herein fill those gaps. The examples described herein provide for four main technical effects. First, introduced is a new concept of slice which allows for better distinguishing between application and network services. Second, described is an end-to-end slice architecture which allows for taking into account processing and storage latencies, especially those within the MEC. Third, described is an overall management architecture which allows for operating the life-cycle management of such end-to-end slices. Finally, described is an implementation of the described architecture while focusing on the MEC domain.

Network Slicing

Early network designers proposed to set up virtual LANs to provide network segmentation at the data link layer, addressing issues such as scalability, security, and network management of switched Ethernet networks. However, over the years, the concept of network slicing has significantly evolved. One of the main drivers of this technology has become the need for network service flexibility and programmability to efficiently accommodate diverse business use cases. More recently, a network slice is commonly defined as a logical network that provides specific network capabilities and characteristics to support certain communication services serving a business purpose while ensuring functional and performance isolation. While there is a consolidated high-level view of network slicing, various network slicing models are currently under definition depending on the virtualization technology, the network architecture, and the standard development organization (SDO). Refer to [ETSI MEC ISG, Multi-access Edge Computing (MEC); Support for network slicing, Group Report MEC 024 V2.1.1, ETSI (November 2019)] for a comprehensive comparison of different slicing concepts. The 3GPP approach to network slicing provides the foundation for the herein described end-to-end (E2E) slicing management architecture. Current trends to integrate support for network slicing into the MEC standard are further described herein, as well as identification of gaps to be filled to extend slicing to the edge, which such gaps are filled by the examples described herein.

3GPP Network Slice Concept and Building Blocks

The 3GPP approach to network slicing is inherited from the NGMN network slicing concept, and it is based on the distinction between network slices and network slice instances (NSIs). Specifically, a network slice is defined as "a logical network that provides specific network capabilities and network characteristics, supporting various service properties for network slice customers" [refer to 3GPP, Management and orchestration; concepts, use cases and requirements (release 17), Technical Specification 28.530 V17.1.0, (March 2021)], while a NSI is an activated network slice, namely " . . . a set of network functions and the resources for these network functions which are arranged and configured . . . to meet certain network characteristics . . . " that are required by a communication service [refer to 3GPP, Telecommunication management; Study on management and orchestration of network slicing for next generation network (Release 15), Technical Report 28.801 V15.1.0, (January 2018).]. Following the relationship between CS and NS, the 3GPP network slicing architecture is organized into three distinct logical layers: 1) a service instance layer, 2) a network slice instance layer, and 3) a resource layer. The first layer encompasses the service instances (a.k.a. Communication services (CS) in 5G networks) that are associated with service-level agreements (SLA), namely business contracts between the service provider and the clients, which specify the service levels to be ensured. The second layer comprises the NSIs that are deployed to serve the CS requirements. Each NSI is associated to a Network Slice Template (NST), which describes the general structure and configurations of the network slice, and the Service Level Specification (SLS), which lists the set of technical attributes that have to be satisfied by the deployed network slice. In other words, the SLS translates the business objectives of the SLA to network characteristics. Finally, the third layer includes the necessary physical (hardware and software) and logical resources to support the NSIs.

Figure 6:
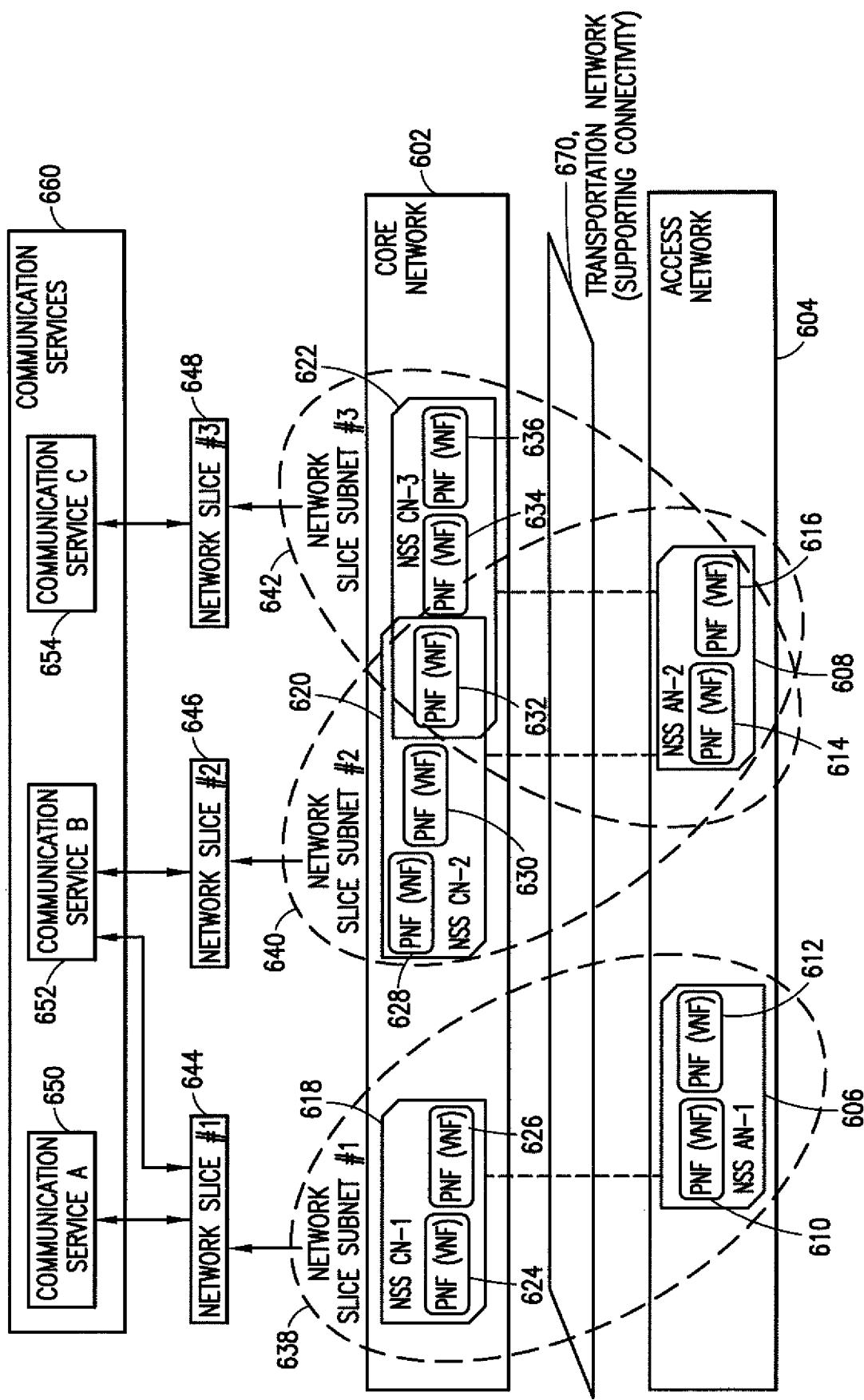
FIG. 6 is an exemplary illustration of the relationships between communication services, network slices, network slice subnets and resources/network functions.

Although a network slice is designed from an end-to-end perspective, the 3GPP management architecture recognizes that a network slice spans different technical domains, namely device, access network, core network, transport network and network management system, with separate scope and technologies. For this reason, the 3GPP network slicing architecture introduces the concept of Network Slice Subnets (NSSs), defined as " . . . a set of network functions and the associated resources (e.g. compute, storage and networking resources) supporting network slice." [refer to 3GPP, Management and orchestration; concepts, use cases and requirements (release 17), Technical Specification 28.530 V17.1.0, (March 2021)]. If a 3GPP CS can be seen as a business wrapper of one or more network slices, in turn, a network slice is a wrapper of one or more network slice subnets with some Service Level Specification (SLS). FIG. 6 illustrates the relationship between these different concepts. In FIG. 6, there are several points worth noting. Network Functions (NF) refer to processing functions of the 5G network (both access 604 and core networks 602), which expose APIs to provide one or more services to other NFs, following the producer-consumer concept. NFs include physical network nodes (namely Physical Network Functions or PNF) and Virtual Network Functions (VNF). A VNF is a software implementation of a network function within an NFV infrastructure (NFVI). In FIG. 6, network slice subnet AN-1 606 and network slice subnet AN-2 608 each contain distinct sets of NFs of the access network (610, 612, 614, 616), while network slice subnet CN-2 620 and network slice subnet CN-3 622 partly share some of the NFs of the core network, including shared NF 632.

The network operator offers network slice subnet 1 638 as a network slice 1 644 to CS A 650. For this purpose, the network operator associates the SLS derived from the SLA of CS A 650 to network slice subnet 1 638. Note that a network slice can satisfy the service requirements of different communication services 660 (e.g., network slice 1 644 in FIG. 6 is serving both CS A 650 and CS B 652). Finally, it is helpful to point out that the deployment template of a network slice subnet should contain the descriptors of its constituent NFs and information relevant to the links between these NFs, such as the topology of connections and QoS attributes for these links (e.g. bandwidth). The latter information can be represented in the form of a graph, using the data information model defined by the ETSI NFV standard for describing the Virtualized Network Function Forwarding Graph (VNFFG).

FIG. 6 further shows a transportation network 670. FIG. 6 also shows communication service C 654, network slice #2 646, network slice #3 648, network slice subnet #2 640, network slice subnet #3 642, NSS CN-1 618 comprising NFs 624 and 626, NFs 628 and 630 of network slice subnet #2 640 which are not shared with network slice subnet #3 642, and NFs 634 and 636 of network slice subnet #3 642 which are not shared with network slice subnet #2 640.

3GPP Network Slice Management Architecture

Figure 7:
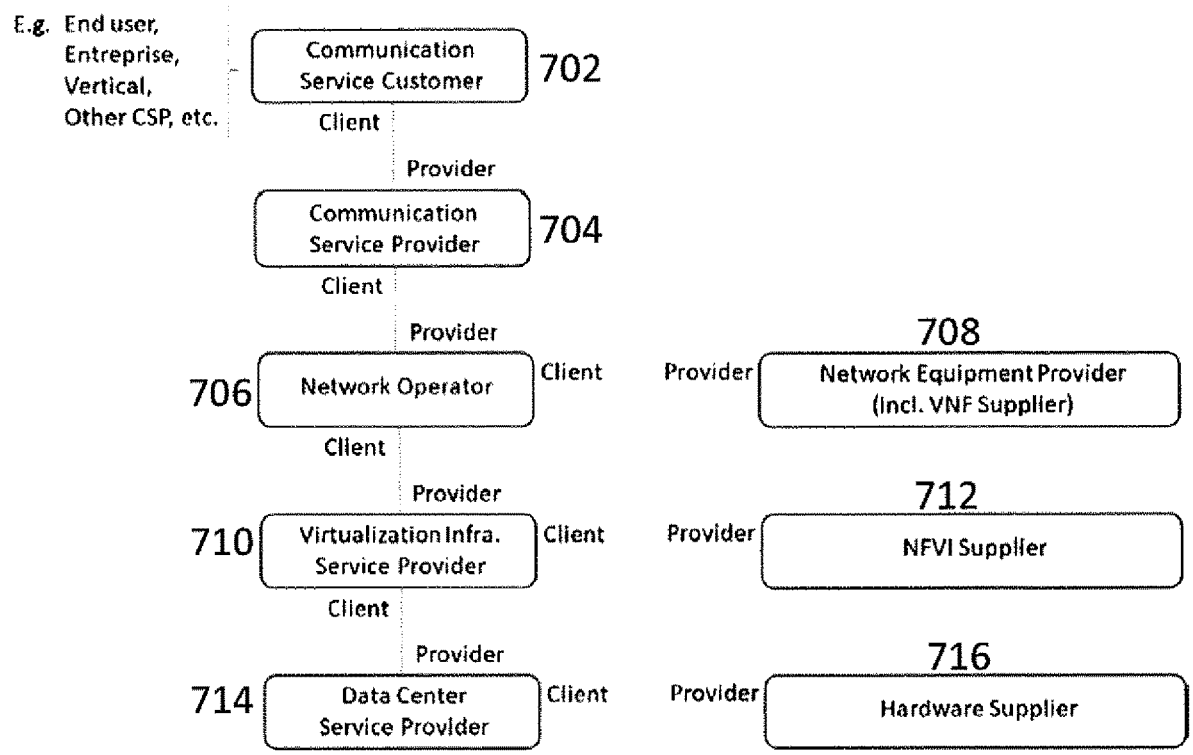
FIG. 7 is a diagram depicting high level roles in a network slice framework.

In order to lay the groundwork for the design of an overall network slice management architecture, the 3GPP has defined high-level operational roles, which permit to draw clear boundaries in terms of operational responsibilities. FIG. 7 illustrates the different roles as identified by the 3GPP, which are defined as follows:

Communication Service Customer (CSC) 702: consumes communication services.
Communication Service Provider (CSP) 704: provides communication services that are designed, built and operated with (or without) a network slice.
Network Operator (NOP) 706: designs, builds and operates network slices.
Network Equipment Provider (NEP) 708: supplies network equipment including VNFs to a network operator.
Virtualization Infrastructure Service Provider (VISP) 710: provides virtualized infrastructure services.
Data Centre Service Provider (DCSP) 714: provides data centre services.
NFVI Supplier 712: supplies a network function virtualization infrastructure.
Hardware Supplier 716: supplies hardware.

An organization can play one or several roles simultaneously (for example, a company can play CSP and NOP roles simultaneously). Further, as shown in FIG. 7, the entities function as a client, provider, or both a client and provider.

Figure 8:
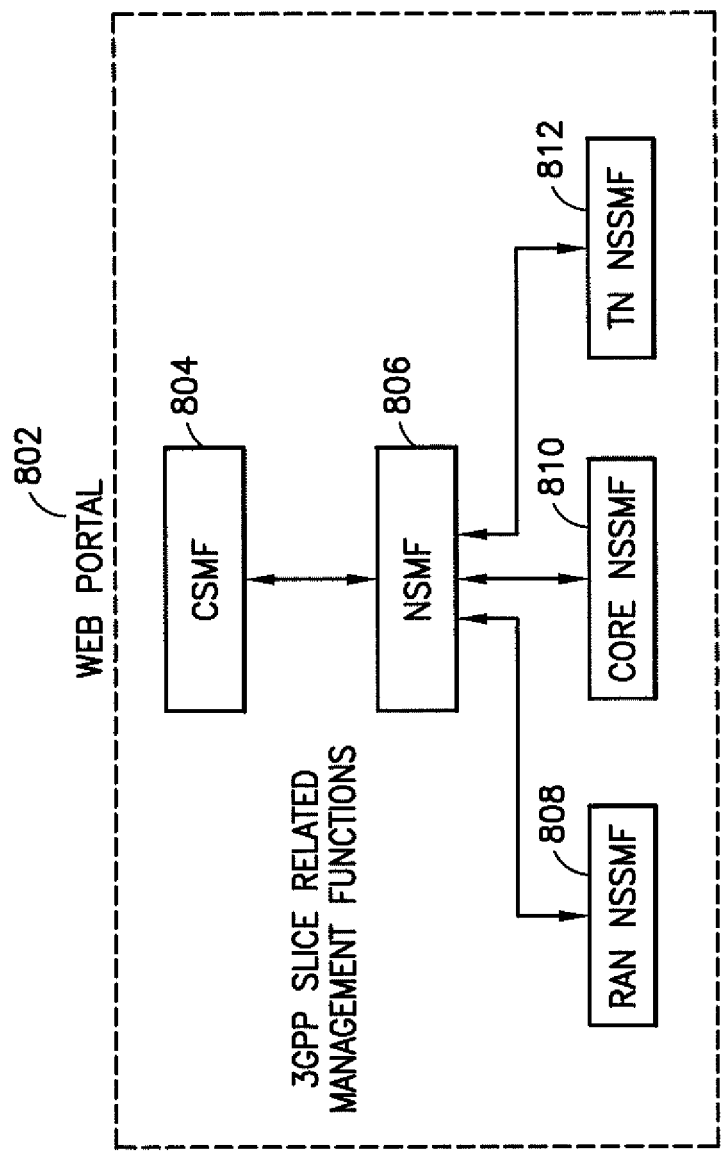
FIG. 8 depicts a 3GPP network slice management architecture.

The 3GPP has also standardized the orchestration and management functions for the life-cycle management of network slices. Specifically, the 3GPP slicing management architecture is reduced to three essential network functions, called CSMF 804, NSMF 806, and NSSMF (made up of RAN NSSMF 808, Core NSSMF 810, and TN NSSMF 812), as also illustrated by FIG. 8. Web portal 802 provides a management function to access the various slice related management functions.

The Communication Service Management Function (CSMF) 804 is the user interface for slice management. It converts the SLAs of the CSs requested by the CSC into SLS and delegates the management of NSIs to NSMFs. The Network Slice Management Function (NSMF) 806 manages NSIs and splits them into subnets for the RAN, transport and core domains. Then, the NSMF 806 delegates the management of slice subnets to NSSMFs (808, 810, 812). The Network Slice Subnet Management Function (NSSMF) (808, 810, 812) applies the NSMF's life-cycle management commands (e.g., instantiate, scale, terminate, remove) within a particular subnet.

3GPP also assumes that a CSC can rely on a web portal to request the creation of a network slice, using the NST made available by the CSMF 804. It is also worth pointing out that the NSSMF (808, 810, 812) is where most of the slice intelligence resides. It takes a command from the NSMF, such as "build a slice," and activates it by doing all the behind-the-scenes work of function selection, storage, configuration, and communication. Once each sub-slice is created, the NSMF 806 is in charge of stitching them together to build the end-to-end network slice.

ETSI Multi-Access Edge Computing (MEC)

Figure 9:
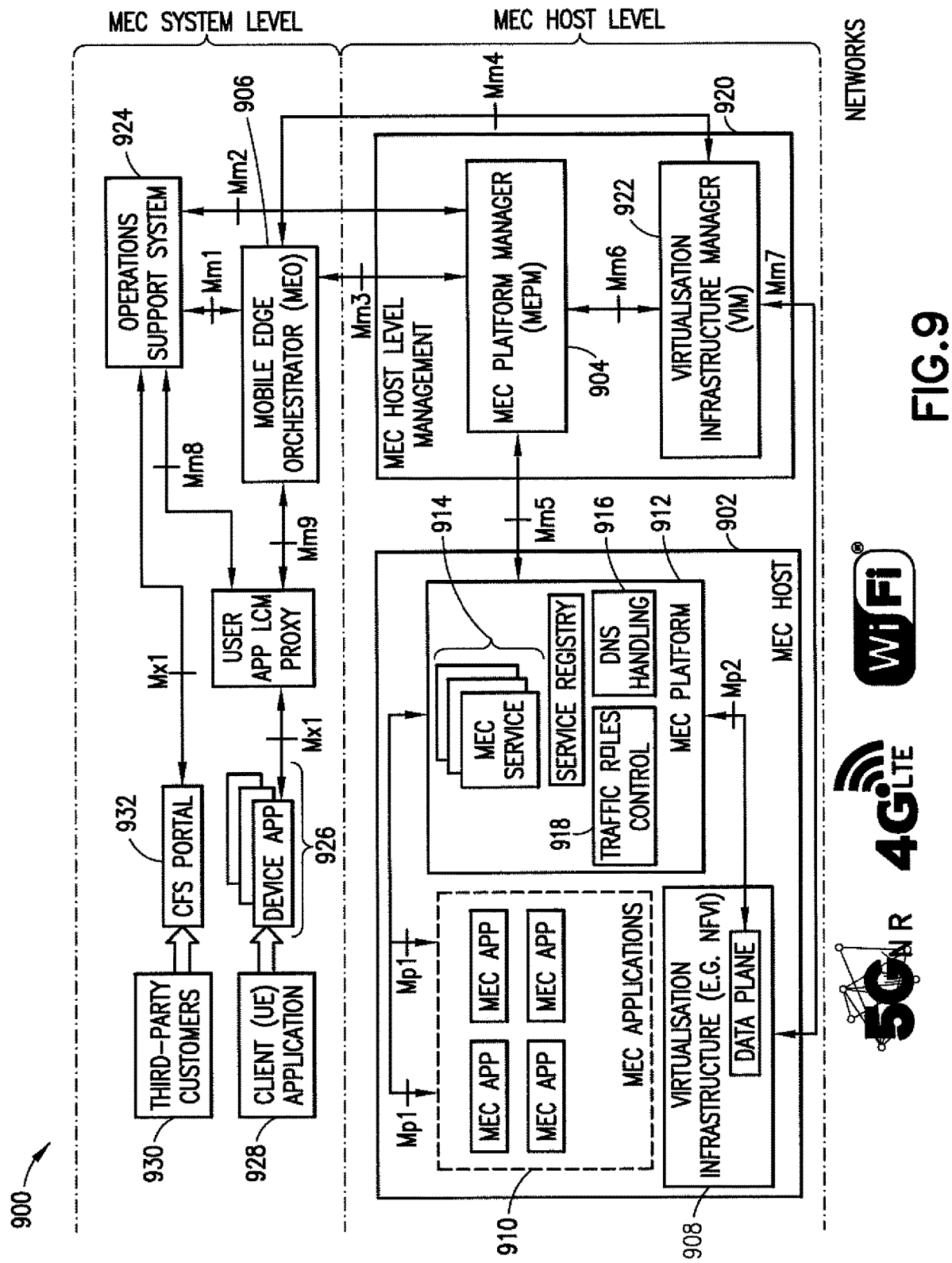
FIG. 9 is a block diagram of an example MEC reference architecture.

The ETSI organization has introduced the Multi-access Edge Computing (MEC) since 2014 to provide a standard framework for the development of inter-operable applications over multi-vendor edge computing platforms. To this end, the MEC technology provides a new distributed software development model containing functional entities, services, and APIs, enabling applications to run on top of a generic virtualization infrastructure located in or close to the network edge. For the sake of discussion, FIG. 9 shows the generic ETSI MEC reference architecture 900, which consists of three main blocks: (i) the MEC Host 902, (ii) the MEC Platform Manager (MEPM) 904 and (iii) the MEC Orchestrator (MEO) 906.

The MEC host 902 is at the core of the MEC architecture 900 as it contains: (i) the generic virtualization infrastructure (VI) 908, which provides compute, storage, and network resources for the MEC applications; (ii) the MEC applications 910 running on top of the VI 908 (existing ETSI MEC specifications assume that MEC applications 910 are deployed as VMs using a hypervisor-based virtualization platform, but alternative virtualization technologies and paradigms are under consideration); and (iii) the MEC platform 912, an environment that hosts MEC services 914 and offers to authorized MEC applications 910 a reference point to discover and consume MEC services 914, as well as to announce and offer new MEC services 914. As discussed in detail further herein, MEC services 914 are an essential component of a MEC system, as they allow MEC applications 910 to be network-aware. In addition, the MEC platform 912 is responsible for configuring 916 a local DNS server and instructing 918 the data plane of the VI on how to route traffic among applications, services, existing DNS servers/proxies, and external networks. A management layer 920 is associated with the MEC hosts 902 of a MEC system, including a virtualization infrastructure manager (VIM) 922 and a MEC platform manager (MEPM) 904. The VIM 922 is responsible for allocating, maintaining, and releasing the virtual resources of the VI 908. The MEPM 904 is responsible for managing the life-cycle of MEC applications 910 and informing individual MEC platforms 912 about application rules, traffic rules 918, and DNS configuration 916. Finally, the MEO 906 is the core functionality of the MEC system-level management. Specifically, the MEO 906 is responsible (i) for selecting the MEC host(s) 902 for application instantiation based on application requirements and constraints (e.g. latency), available resources, and available services; and (ii) for maintaining an updated view of the MEC system 900. Furthermore, the MEO 906 is interfaced with the Operations Support System (OSS) 924 of the network operator, which receives the requests for instantiation or termination of applications from either applications 926 running in the devices (e.g. UEs (110, 928)) or from third-party customers 930 through the CFS portal 932. It is helpful to point out that the MEC standard provides a complete specification of only a limited set of necessary APIs, and associated data models and formats, but most of the management reference points are voluntarily left open by the standard to foster market differentiation.

MEC and Network Slicing

As pointed out, the MEC is a distributed computing environment at the edge of the network, on which multiple applications can be served simultaneously while ensuring ultra-low latency and high bandwidth. To achieve this goal, applications have real-time access to network information through APIs exposed by MEC services. According to the MEC standard [refer to ETSI, Multi-access edge computing (mec); framework and reference architecture, Group Specification ETSI GS MEC 003 V2.2.1, ETSI ISG MEC (12 2020)], each MEC system is mandated to offer services providing authorized applications with (i) radio network information (such as network load and status), and (ii) location information about UEs served by the radio node(s) associated with a MEC host. Furthermore, the Bandwidth Manager service, when available, permits both the allocation of bandwidth to certain traffic routed to and from MEC applications and the prioritization of that traffic, also based on traffic rules required by applications. Based on the above, it is straightforward to realize that the fundamental design behind the MEC architecture is to enable a network-aware application design, namely, to allow MEC applications and MEC platforms to leverage network information to satisfy their requirements.

On the contrary, the 3GPP-based network slice concept envisions an architectural shift as it relies on a communication service-centric network provisioning. For this reason, the ETSI MEC group has recently started discussing which new MEC functionalities and interfaces, as well as extensions to existing MEC components, are required to support network slicing, e.g. by including network slice ID into different MEC interfaces. The ETSI report has identified several use cases based on the different network slicing concepts that are advocated in different SDOs.

The most advanced proposal for supporting network slicing in MEC systems is the so-called MEC-in-NFV architecture which permits to deploy MEC applications and MEC platforms as VNFs. To integrate MEC hosts in a NFV environment, the ETSI standard proposes to substitute (i) the MEPM with a MEPM-V entity that delegates the MEC-based VNF life-cycle management to one or more VNF managers (VNFM), and (ii) the MEO with a MEC application orchestrator (MEAO) that delegates to the NFV orchestrator (NFVO) the resource orchestration for MEC VNFs. Different uses cases are also possible in the context of the MEC-in-NFV architecture, for instance, to enable the sharing of a MEC host with several NSIs, or to allow MEC applications belonging to multiple tenants to be deployed in a single NSI. ETSI MEC also recognizes the importance of the contribution of MEC applications to end-to-end latency. Thus, a use case exists in which the MEC platform is included in a 3GPP NSI, and the end-to-end network delay budget takes into account MEC components and in particular, the delay from the data network to the MEC platform as shown in FIG. 10.

Figure 10:
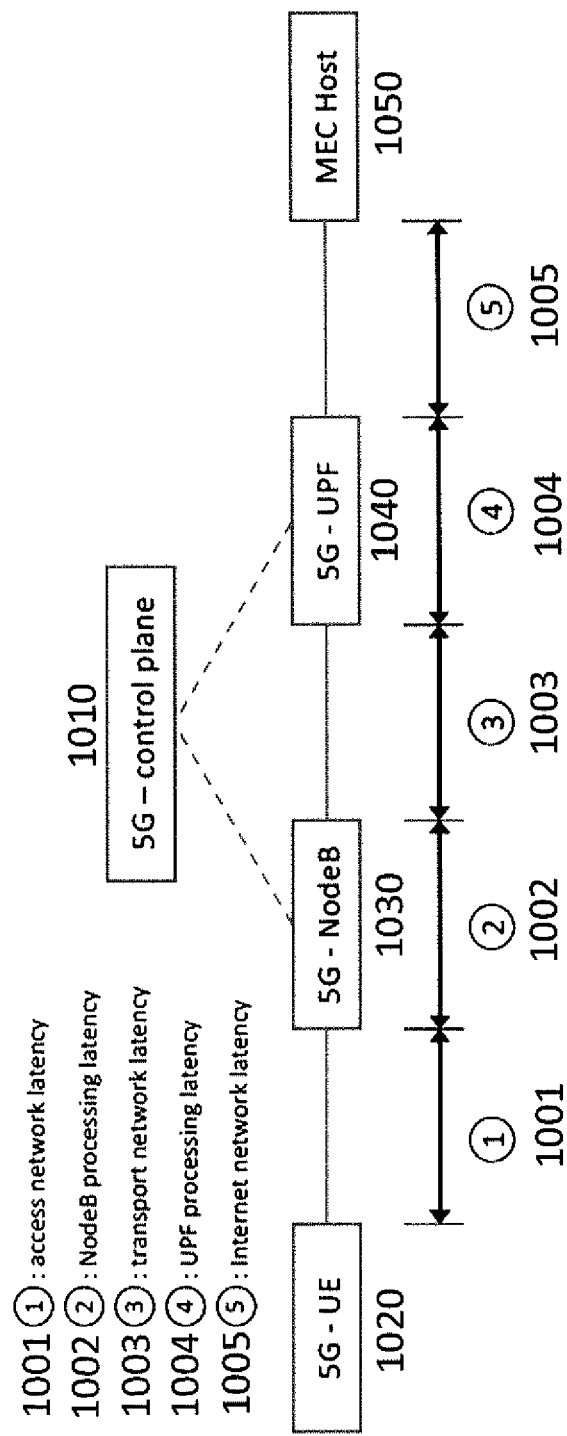
FIG. 10 is a diagram showing end-to-end network latency of a network slice instance (NSI) that includes MEC.

In particular, FIG. 10 shows access network latency 1001 between the UE 1020 and the network node 1030, network node processing latency 1002, transport network latency 1003 between the network node 1030 and the UPF 1040, UPF processing latency 1004, and internet network latency 1005 between the UPF 1040 and the MEC host 1050. FIG. 10 also shows the control plane 1010 coupled to the network node 1030 and the UPF 1040.

In this case, the descriptor of the network services to be created in the NFV environment shall include the network latency requirement, which is distributed to the access network, core network, transport network and data network. This would require extending the data model of the NFV service descriptors to include the Application Descriptor, which contains fields to indicate the type of traffic to offload and the MEC service to consume. However, such a proposal has the drawback of requiring the 5G CSMF to translate application-service-related requirements into network-slice-related requirements. Indeed, SLA frameworks regarding application services are typically different from communication services (as per the 3GPP definition). For instance, data backup is often part of an application service SLA but is not part of a communication service SLA. Thus, radical changes in CSMF implementations would be needed to support such use cases.

A harmonized view of the possible use cases may be defined in to enable MEC frameworks to provide transparent end-to-end multi-slice and multi-tenant support by facilitating the sharing of MEC applications and MEC platforms among multiple NSIs. To this end, an inter-slice communication mechanism is described that automatically filters exchanged data between slices installed on the same MEC facilities. Focusing on 5G networks, extensions of the slice management architecture can enable the integration of MEC as a sub-slice by introducing the MEC NSSMF component. The examples described herein implements a slice management architecture as one of the starting points of an envisioned business model in which multiple tenants exist who are willing to pay to get isolated slices of network and edge computing resources. However, taking it a step further, the examples described herein show how tenants can be provided with complete but isolated MEC stacks so that they can independently orchestrate their assigned resources to the served customers.

E2E Slice Architecture for MEC Applications

Described herein are the concepts of application services (AS) and application slices (APS), and how these concepts are instantiated in the context of MEC systems. An application slice is described herein from both operation and business perspectives with introducing operation and business roles, respectively, and relationships of the different entities involved in application slice and service provisioning. Also described herein are the different architectural use cases that correspond to provided model. Further described herein is an orchestration/management architecture for 3GPP networks that enable such new use cases. An extended MEC reference architecture required to support the envisioned management architecture is described.

Preliminary Concepts

As may be inferred from the description herein, the 3GPP CSs cannot be straightforwardly used to model the services offered by an edge computing platform. For the sake of disambiguation, in this description, the services offered to the customers of an edge computing platform are referred to as Application Services (ASs). The main reason is that CSs and ASs are designed to support different business purposes, i.e., regulated by different SLA frameworks. Specifically, CSs are dedicated to the transmission of data and network traffic, while ASs are designed to support services which are generally not communication oriented in essence, but focus on data processing, such as Augmented Reality (AR), Virtual Reality (VR), Ultra-High Definition (UHD) video, real-time control, etc. From the management perspective, it would not be sensible to manage ASs with the existing 3GPP CSMF. Some extensions or new management functions should be added to the overall management framework to translate application-related SLAs into application-related SLSs and network-related SLSs.

In analogy to the 3GPP network slice concept, an Application Slice (APS) is defined as a virtualized data collection and a set of data processing resources that provides specific processing functions with adapted SLS to support an Application Service and the associated SLA. The APS can possibly include Network Functions to ensure correct data communication among the previous processing functions. An aspect of the application slice concept is the support of isolation not only of the resources that are used by each application slice but also of the management data and functions. Similarly to a network slice, the application slice is an end-to-end concept and can span multiple domains (e.g., device, edge platform, network). Furthermore, an application slice is not a monolithic entity. Following the well-known principles of service-oriented architectures, it is built as a set of atomic data-processing functions which have well defined functional behaviors and interfaces, referred to herein as Application Component Functions (ACFs). An Application Slice Subnet (APSS) is defined as a set of at least one ACF and possible NFs supporting an application slice. It is essential to point out that application slices and network slices are not independent concepts, but they are strongly intertwined as application slices deployed at the edge of the network require dedicated network slices to deliver the massive amounts of data and network traffic that Application Services typically produce. As illustrated in detail herein, two distinct models can be distinguished to allow an application slice to use a network slice.

The general concepts that have been described can be easily instantiated in the context of MEC, NFV and 5G systems. First, a MEC platform can be used to offer ASs, which can be deployed as conventional MEC applications and implemented using a collection of ACFs. Furthermore, the MEC system can be considered as one of the domains over which an application slice can span. Thus, the MEC management layer should be responsible for the orchestration and deployment of one of the application slice subnets that compose the E2E application slice, referred to as an MEC application slice subnet. A MEC application slice subnet includes one or more ACFs, but it can also include VNFs to support network functionalities.

The VNFs and ACFs have differences and are designed for different purposes—network traffic processing for VNFs and data processing for the ACFs. Furthermore, in a multi-tenant MEC environment, it is likely that the MEC applications implementing ACFs may not be orchestrated by the same entity that would orchestrate principal VNFs.

Nevertheless, there are a lot of common points in terms of operation and management between a VNF and an ACF as both rely on the same set of virtualization technologies for their deployment. Thus, both the 3GPP management architecture for network slice and the MEC-in-NFV architecture can be extended to support the herein described E2E application slice framework.

High-level Roles for Application Slice Management

From the APS management (and orchestration) perspective, high-level roles need to be defined in order to draw responsibilities boundaries similarly to what was proposed for 5G network slice management (see FIG. 7). As discussed herein, the focus is on Application Services that are offered by a MEC system.

Figure 11:
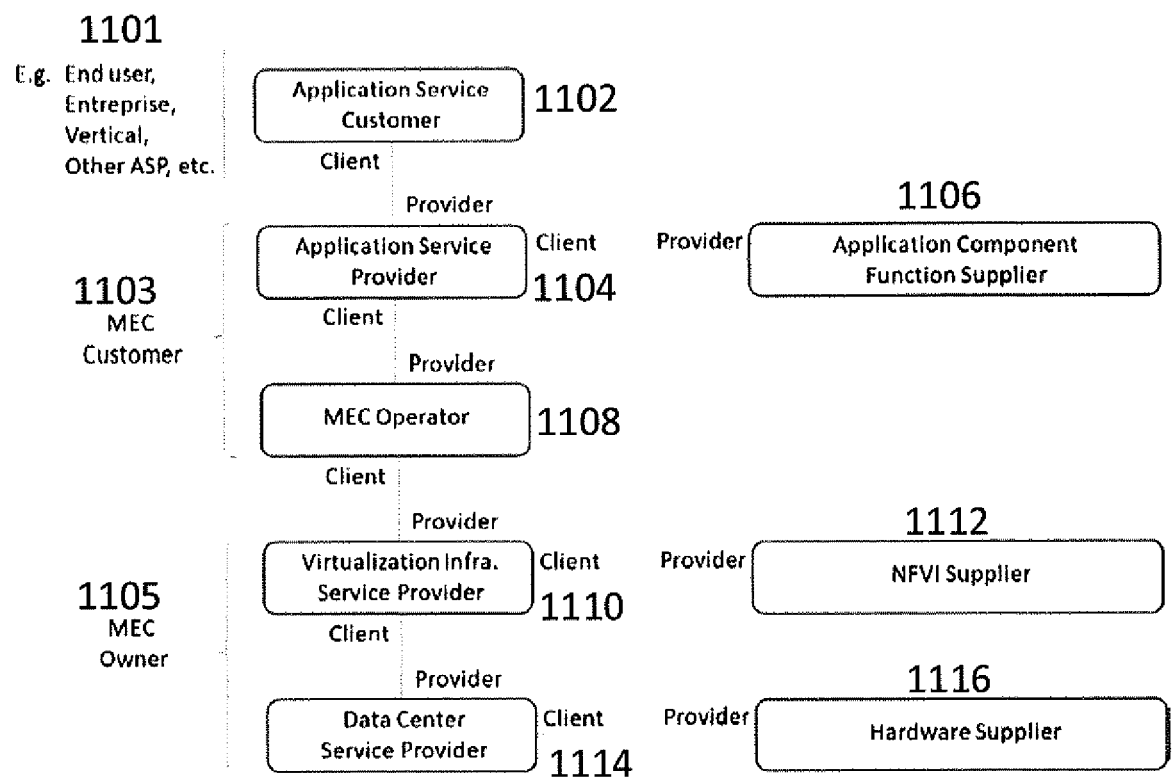
FIG. 11 is a diagram showing high-level functional roles in an MEC application slice framework.

FIG. 11 shows the different roles identified. The Application Service Consumer (ASC) 1102 uses Application Services. The Application Service Provider (ASP 1104) provides Application Services that are built and operated upon one or multiple application slice subnets, including MEC application slice subnets. Each of those application slice subnets is in turn built from a set of ACFs provided by the Application Component Function Supplier 1106. The MEC Operator (MOP) 1108 operates and manages ACFs and MEC applications using a MEC Platform. It is assumed that the MEC Operator 1108 implements the MEC orchestrator and the ETSI MEC standardized interfaces. The MEC Operator 1108 designs, builds and operates its MEC platform to offer, together with the MEC orchestrator, MEC application slice subnets to ASPs from ACFs that the ASP has provided as an input. The Application Component Function Supplier 1106 designs and provides ACFs to ASPs.

Interestingly, an ASC 1102 can become an ASP 1104 while adding new ACFs into consumed ASs and providing new ASs. For instance, assume that ASC $C_1$ uses from ASP $P_1$ and AS $S_1$ that provides face recognition capabilities. Then, ASC $C_1$ can integrate into $S_1$ other ACFs that permit to retrieve a video stream from customers' cameras and ACFs that take control of customers' door, thus building a new AS $S_2$, which provides automatic door opening based on face recognition. ASC $C_1$ then becomes a new ASP $P_2$ selling the previous new AS to customers such as house/apartment rental platforms. Furthermore, a parallel can be made between FIG. 11 and FIG. 7. Roles responsible for low layers, namely Hardware Supplier 1116, Data Center Service Provider 1114, NFVI Supplier 1112, and Virtualization Infrastructure Service Provider 1110, remain the same. However, the Application Component Function Supplier 1106 has replaced the VNF (or Equipment) Supplier 708; the MEC Operator 1108 has replaced the Network Operator 706, the Application Service Provider (ASP) 1104 has replaced the CSP 704, and the Application Service Customer (ASC) 1102 has replaced the CSC 702. As shown in FIG. 11, items may operate as a client, a provider, or both a client and a provider.

A business organization can play one or multiple operational roles simultaneously. Therefore, without attempting to be exhaustive in terms of business models, the work as described herein is focused on two categories of organizations whose responsibility boundaries appear to make most of the sense.

The MEC Owner 1105 plays both Hardware supplier 1116 and NFVI supplier 1112 roles. The fact that the MEC Owner 1105 also manages the virtualization infrastructure 1110 and the edge servers allows the MEC Owner 1105 to dynamically split the infrastructure into logical partitions or network slices (i.e. greater degree of flexibility). The MEC Owner 1105 could be the equivalent of what is referred to as the MEC Host Operator, as the MEC Owner 1105 offers virtualized MEC hosts to its customers. However, the 'MEC Owner' 1105 terminology is preferred to avoid confusion with the 'MEC Operator' 1108 role.

The MEC Customer 1103: plays both the role of the MEC Operator 1108 and ASP 1104. The ASP role 1104 offers a business interface (with the ASC 1102). In contrast, the MEC Operator 1108 role offers the actual enforcement/implementation (i.e. SLS) of the business objectives (i.e. SLA) agreed across the ASP 1104 business interface. The MEC Operator 1108 role alone cannot endorse a business organization as it only offers an Application Slice (including SLS) and not the Application Service (with related SLA).

From a business and technical perspective, a multi-tenancy model in which ASCs 1102 are tenants of a MEC Customer 1103 is preferred, where MEC Customers 1103 are tenants of a MEC Owner 1105. As explained further herein, the described multi-tenant MEC system supports data isolation (through separated data planes) and resource orchestration separation (through separate resource orchestrators) between tenants.

The application service customer 1102 may, as shown in FIG. 11, be an end user, an enterprise, a vertical, or other ASP, etc. (collectively 1101).

Application-Slice Deployment Models

Two distinct deployment models are distinguished for the described application slice concept: (i) the overlay model, and (ii) the stitching model.

Figure 12:
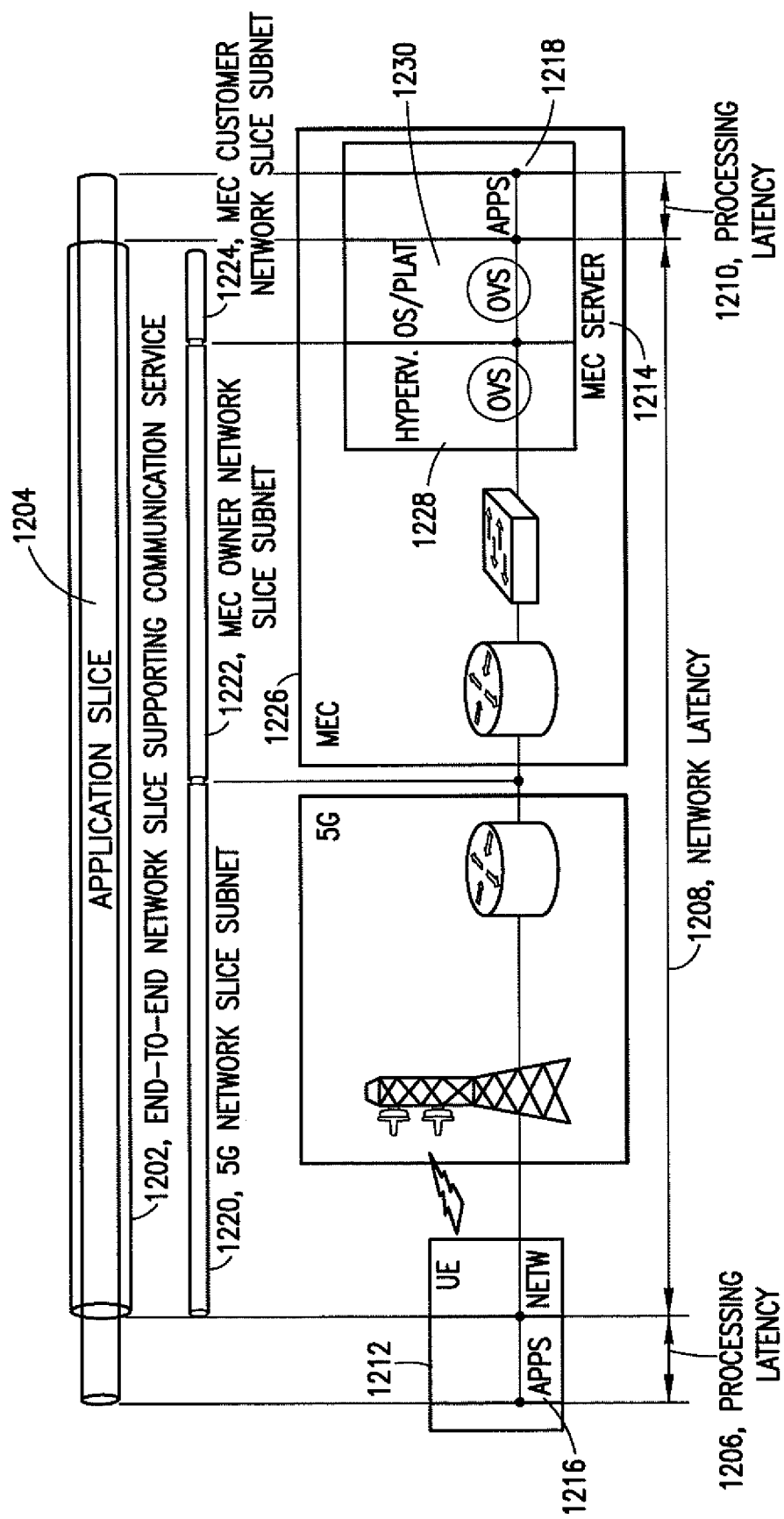
FIG. 12 illustrates an overlay deployment model, where the application slice is a consumer of an E2E network slice.

The first model assumes that the E2E APS is a consumer of a Communication Service offered by the underlying network slices (see FIG. 12). In this case, the E2E network slice 1202 is responsible for the entire communication latency, including network latency 1208. In addition to the E2E network slice 1202, the application slice 1204 caters for processing and possibly storage latency at both ends, including processing latency 1206 at the UE 1212 (by apps 1216 of the UE 1212), the network latency 1208, and the processing latency 1210 incurred at the MEC server 1214 end (by apps 1218 of the MEC server 1214).

The E2E network slice 1202 encompasses not only the 5G network slice subnet 1220 but also the network slice subnets (1222, 1224) within the MEC Owner 1222 and MEC Customer 1224 domains. Indeed, as shown in FIG. 12 the herein described slicing framework leverages recent advantages on virtualization technologies that allow a virtualization layer to be composed of multiple nested sub-layers, each using a different virtualization paradigm. According to the functional role split illustrated in FIG. 11, a MEC Owner 1105/1222 (and MEC 1226) can use a hypervisor technology 1228 to operate its MEC hosts and to deploy multiple virtualized environments to MEC customers 1103/1224 (e.g. allocating one or more Virtual Machines or VMs (in ETSI NFV terminology, a VM is also designated as 'NFV VNF') using an NFVI). Each virtualized environment includes a full-fledged MEC system used by the MEC Customer 1103/1224 to allocate further the resources assigned to its VMs to the multiple Application Services it deploys to its users by applying internal orchestration and management criteria. In the case of the MEC customer 1103/1224, a container-based virtualization technology, for instance, could be used as a top virtualization sub-layer to manage application deployment into its allocated virtualized MEC system. In FIG. 12 the E2E network slice 1202 includes the data plane (including operating system platform 1230) of the MEC customer 1103/1224. However, an alternative overlay model is also possible in which the E2E network slice 1202 terminates at the network boundary 1302 between the MEC Owner 1222 and the MEC Customer 1224 as per FIG. 13.

Figure 13:
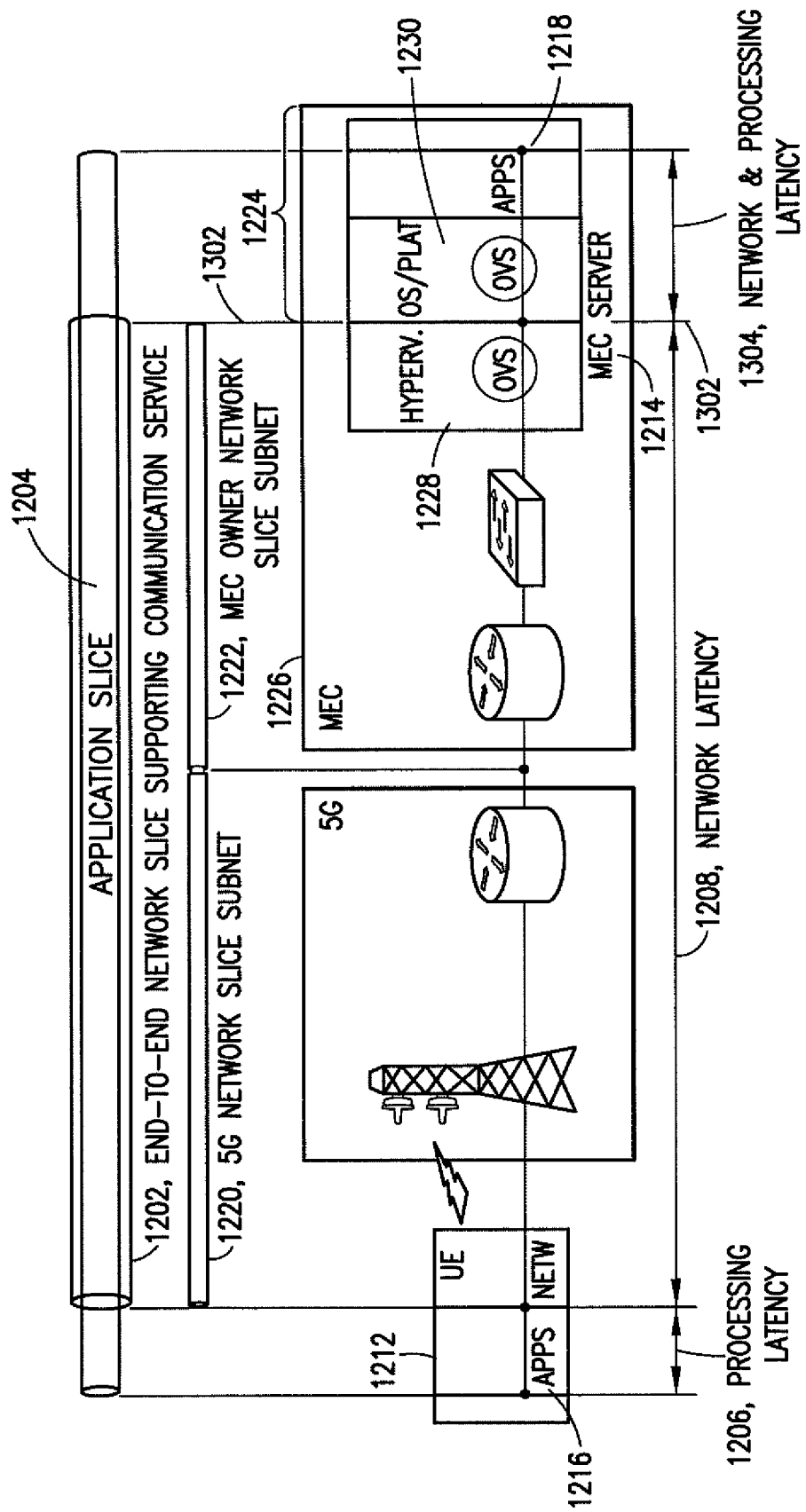
FIG. 13 illustrates an alternative overlay deployment model.

As further shown in FIG. 13, the network and processing latency 1304 includes that incurred by the operating system platform 1230 of the MEC Server 1214 and the applications 1218 of the MEC server 1214, where the network and processing latency 1304 including the processing latency 1210 shown in FIG. 12.

In the stitching deployment model (shown in FIG. 14), it is assumed that the MEC application slice subnet 1402/1224 is a peer of the network slice subnets (1220, 1222). Virtual appliances using a subnet border API, such as a virtual gateway or virtual load-balancer, can be used to interconnect MEC application slice subnets 1402 to the adjacent network slice subnet 1222. Such stitching could be a one-to-one interconnection as well as a multiple-to one interconnection. The end-to-end application slice 1204 could be seen in this case as the composition of different application slice subnets (UE-operated 1404 or MEC-operated 1402) together with network slice subnets (1220, 1222). Latency wise, the MEC application slice subnet 1402 is responsible, in this case, for a tiny part 1406 of the network latency budget 1208 in addition to the processing and storage latency 1304 induced by the MEC applications 1218 and their related ACFs.

The different deployment models lead to different approaches to combine the herein described E2E application slice management/orchestration framework with the 3GPP management architecture, as explained further herein.

Architecture for Application Slicing in a Multi-Tenant MEC System

Figure 15A:
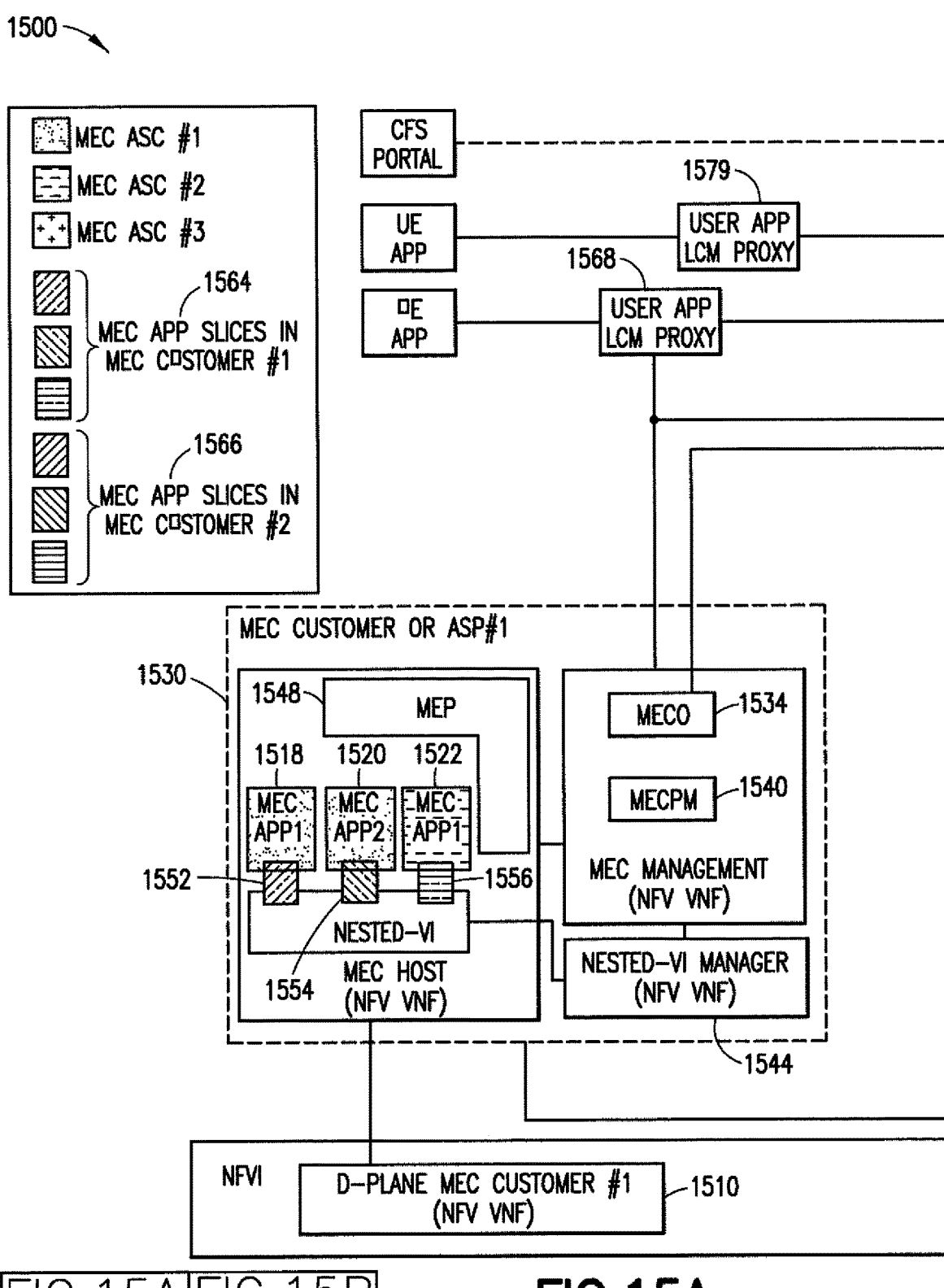
FIG. 15 (including FIG. 15A and FIG. 15B) is a block diagram of a multi-tenant MEC architecture supporting network and application slicing.
Figure 15B:
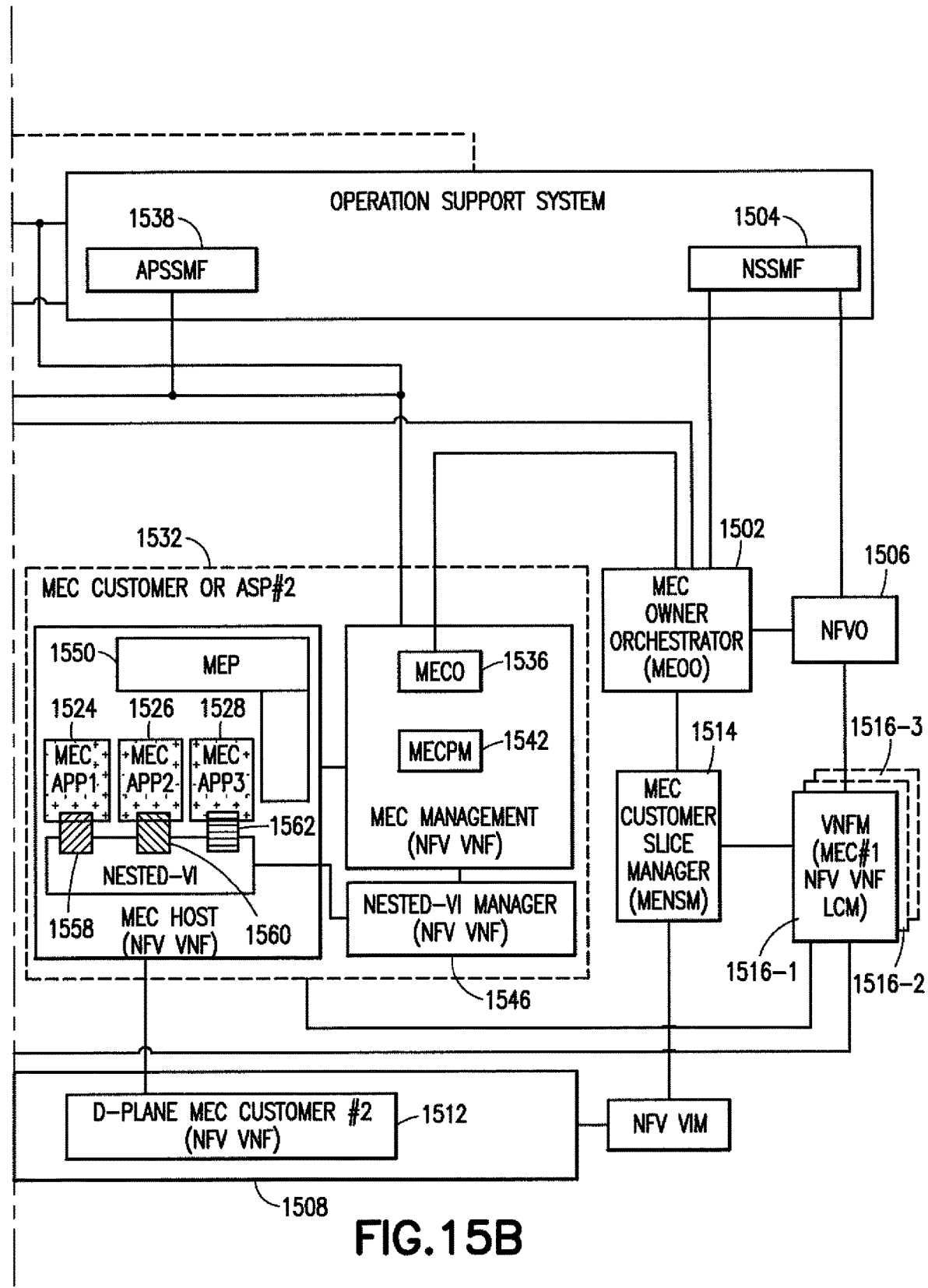

Described herein are new MEC components and extensions to the current MEC management architecture needed to support E2E application slicing and multi-tenancy within multiple MEC customers. FIG. 15 shows another illustrative example of the herein described extended MEC reference architecture 1500. The primary design rationale of the examples described herein is that the MEC system should be split into two responsibility domains following a two-layer hierarchical MEC architecture, where the bottom layer is managed and orchestrated by the MEC Owner, and the top-layer is independently managed and orchestrated by MEC Customers. Such a hierarchical architecture allows a single MEC deployment to host multiple MEC Customers. Each of them has his own MEC network slice subnet (i.e. his dedicated data plane provided by the MEC Owner) with related management capability. In turn, each MEC Customer manages and orchestrates his own MEC application slices.

Figure 14:
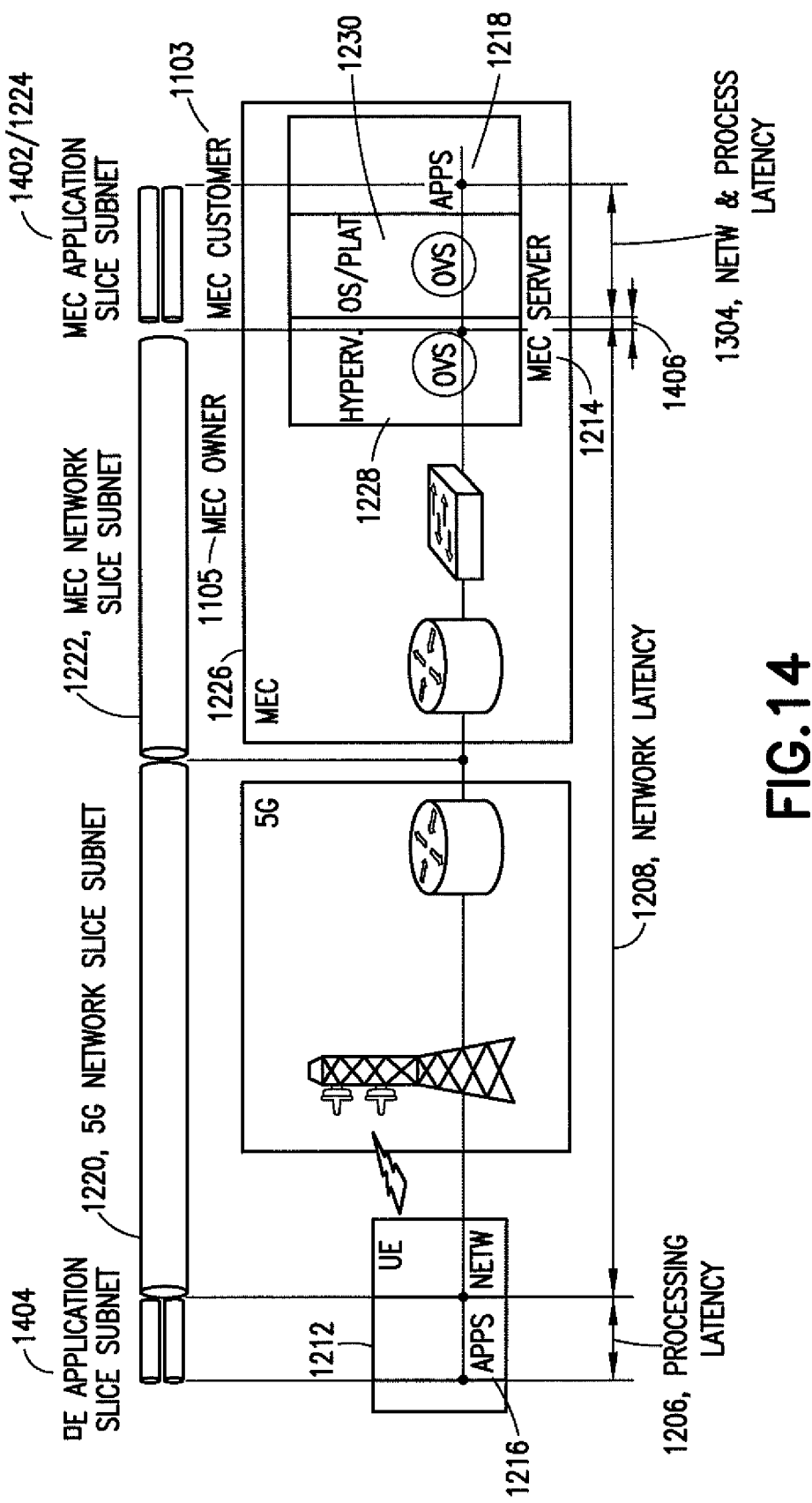
FIG. 14 illustrates a stitching deployment mode, showing interconnection of the different slice subnets to form the E2E application slice.

Implementation-wise, the proposed two-layer MEC architecture is enabled by the nested virtualization capability of the MEC infrastructure, as anticipated with reference to FIG. 12, FIG. 13, and FIG. 14. In the system illustrated in FIG. 15, the MEC Owner does not deploy following a MEC-in-NFV architecture, but a collection of 'ETSI VNFs' (or VMs) to provide each MEC customer with a complete MEC system. The examples described herein do not use 'ETSI VNFs' to deploy MEC applications and MEC platforms, but rather to deploy a virtualized MEC environment encompassing virtualized MEC hosts and a virtualized MEC management system. Furthermore, in the herein described MEC-in-NFV architecture variant, provided are functional blocks that substitute the MEAO and MEPM-V in the original architecture. Specifically, we substitute the MEAO with the MEC Owner Orchestrator (MEOO) 1502, which is in charge of implementing the policies to select the MEC infrastructures on which to deploy a MEC Owner network slice subnet. The MEOO 1502 receives the commands to create, modify or delete a MEC Owner network slice subnet from a 3GPP management function called MEC NSSMF 1504. Furthermore, the MEOO 1502 collaborates with the MEC Owner NFVO 1506 to provide a dedicated data plane to each MEC customer. For the sake of example, it can be assumed that the MEC Owner offers to each MEC Customer a dedicated Kubernetes cluster, where each K8S node is deployed as a 'ETSI VNF' (or VM) (refer to NFV VNF 1510 and NFV VNF 1512) in the NFVI 1508, which is connected to the 5G Core (5GC) via a dedicated data plane (MEC Customer network slice subnet). The second new functional block is the MEC Network Slice Manager (MENSM) 1514, which delegates the life-cycle management of the 'ETSI VNFs' (1510, 1512) to a dedicated VNFM (one or more of VNFM 1516-1, VNFM 1516-2, and/or VNFM 1516-3), while the MEC Network Slice Manager (MENSM) 1514 is responsible for the management of the network slice subnet (data plane) parameters. For instance, the MEC Network Slice Manager (MENSM) 1514 can reserve network bandwidth between MEC hosts for a given MEC Customer (1530, 1532). Moreover, the MEC Network Slice Manager 1514 could behave like an 3GPP Application Function (AF) which interacts with the 5GC to synchronize data plane forwarding rules to realize local breakout traffic to/from MEC applications (refer to MEC app 1518, MEC app 1520, MEC app 1522, MEC app 1524, MEC app 1526, MEC app 1528).

As initially described, each MEC Customer (1530, 1532) manages and orchestrates its own MEC application slices within the assigned virtualized MEC system 1500. To this end, each MEC Customer (1530, 1532) implements a MEC Customer Orchestrator (MECO) (1534, 1536), which receives the commands to create, modify or delete MEC application slices from a management function called MEC APSSMF 1538 (refer also to FIG. 5 and FIG. 16). Furthermore, the MECO (1534, 1536) collaborates with the MEC Customer Platform Manager (MECPM) (1540, 1542) to manage the MEC application slice life-cycle and the MEC Platform instance (e.g. embodied as a Docker container). In order to stitch the application slice subnets to the adjacent network slice subnets, the MENSM 1514 creates dedicated VNFs (e.g. gateways) (possibly including VNF 1544 and VNF 1546)) that it communicates to the MECO (1534, 1536) (or at least the gateway endpoints). A collaboration between the MECO (1534, 1536) and the MEOO 1502 could also be necessary in case of MEC application relocation to enforce new 5GC forwarding rules or tear down old ones.

With regards to the interaction with the 5GC, there are two possible options (1-2):

1. The MEC Owner (e.g. 1502) provides a network slice to the MEC Customer (1530, 1532) who directly manages via its MEC Platform (MEP) 5GC forwarding rules for each application slice (e.g. adds new DNS rules to the 5GC local DNS servers). This solution allows for better preserving privacy as the MEC Customer (1530, 1532) is the only one who deals with his/her own customers' UE traffic.

2. The MEC Customer MEP (1548, 1550) collaborates (e.g. via the MECO (1534, 1536) and the MEOO 1502) with the MEC Owner Network Slice Manager 1514, who ultimately influences 5GC traffic. This solution allows for the MEC Customer (1530, 1532) to delegate the interaction with 5GC to the MEC Owner. The MEC Owner can aggregate requirements in order to optimize network resources (e.g. bandwidth). Thus, this solution allows for better network optimization at the MEC Owner infrastructure but does not preserve privacy. Also, it may be less scalable as the number of UEs increases.

The MEC Reference Architecture [ETSI, Multi-access edge computing (mec); framework and reference architecture, Group Specification ETSI GS MEC 003 V2.2.1, ETSI ISG MEC (12 2020)] shows a single MEC orchestrator controlling a single virtualization infrastructure and managing the instantiation of all MEC applications. The herein described MEC architecture implies a split of the MEC orchestrator into a MEC Customer Orchestrator (MECO) (1534, 1536) and a MEC Owner Orchestrator (MEOO) 1502. While the MECO (1534, 1536) is responsible for the MEC Platform, MEC applications (1518, 1520, 1522, 1524, 1526, 1528), MEC application slices (1552, 1554, 1556, 1558, 1560, 1562), and related external interfaces (line couplings between entities shown in FIG. 15, including from MEC customer 1530 and MEC customer 1532), the MEOO 1502 is responsible for the hardware, the NFVI 1508, MEC NFVI slices (relating perhaps to VNF 1510 and VNF 1512) (especially MEC network slices) and related external interfaces (line couplings between entities shown in FIG. 15, including from MEOO 1502).

FIG. 15 shows a legend including MEC APSs in MEC customer #1 (1564) and MEC APSs in MEC customer #2 (1566). The MEC APSs in MEC customer #1 1530 include MEC APSs 1552, 1554, and 1556, while the MEC APSs in customer #2 1532 include MEC APSs 1558, 1560, and 1562. There is a further split within MEC customer of ASP #1 1530, wherein MEC app1 1518 and MEC app2 1520 belong to MEC ASC #1, while MEC app1 1522 belongs to MEC ASC #2. MEC app1 1524, MEC app2 1526, and MEC app3 1528 belong to MEC ASC #3 of MEC Customer of ASP #2 1532. User app LCM proxy 1568 is associated with MEC Customer of ASP #1 1530, and user app LCM proxy 1570 is associated with MEC Customer of ASP #2 1532.

Application Slice Management Architecture

With the aforementioned new roles and architecture in mind, the 3GPP network slice management architecture could also be augmented to manage and orchestrate application slices as illustrated in FIG. 5, portions of the description of which are herein repeated, for further clarity. It is assumed that an ASC relies on a web portal 524 to request an application service with a given SLA from a catalogue of offered ASs (see FIG. 18 and corresponding description for more details on how to implement such service catalogue 1802 of CFS portal 1803). The business interaction of the web portal 524 can happen in two manners depending on the AS/APS deployment models that is used in the system (refer to FIG. 12, FIG. 13, and FIG. 14 and corresponding descriptions). In both cases, the web portal 524 communicates with a new management function, called Application Service Management Function (ASMF) 504, which is responsible for translating the SLA of the requested AS to the specification of an APS and to trigger the creation of the APS instance by contacting a new management function called Application Slice Management Function (APSMF) 506. The APSMF 506 splits the APS into multiple subnets, one for each domain over which the requested APS spans, including possibly the network and the AS's endpoints, namely the UE 110 requesting the AS, and the edge system instantiating the AS. To this end, introduced herein is the new Application Slice Subnet Management Function (APSSMF) (512, 522), which applies the APSS life-cycle management commands within the two potential domains that are relevant for an application slice subnet, namely the UE 512 and the MEC 522.

In the overlay model (label 1 501), the E2E ASMF 504 is also responsible for translating the E2E AS SLA into E2E CS SLA and for requiring the adapted E2E CS from the CSMF 508.

In one of the stitching models (label 2 502), the web portal 524 (expert user) is also responsible for breaking the E2E AS SLA into AS SLA and E2E CS SLA and for requiring the adapted E2E CS from the CSMF 508.

Alternatively (label 3 503), the web portal 524 (non-expert user) does not need to perform the aforementioned E2E AS SLA dichotomy. In this stitching model, the APSMF 506 is responsible to communicate directly with the NSMF 510 to manage the network slice subnet associated with the APS.

The management of the network slice via the NSMF 510 and the one of per-domain network slice subnets via NSSMFs are well-defined by 3GPP, and they do not need to be extended.

FIG. 5 further distinguishes between business interfaces (collectively 534) and internal interfaces (collectively 536).

Figure 16:
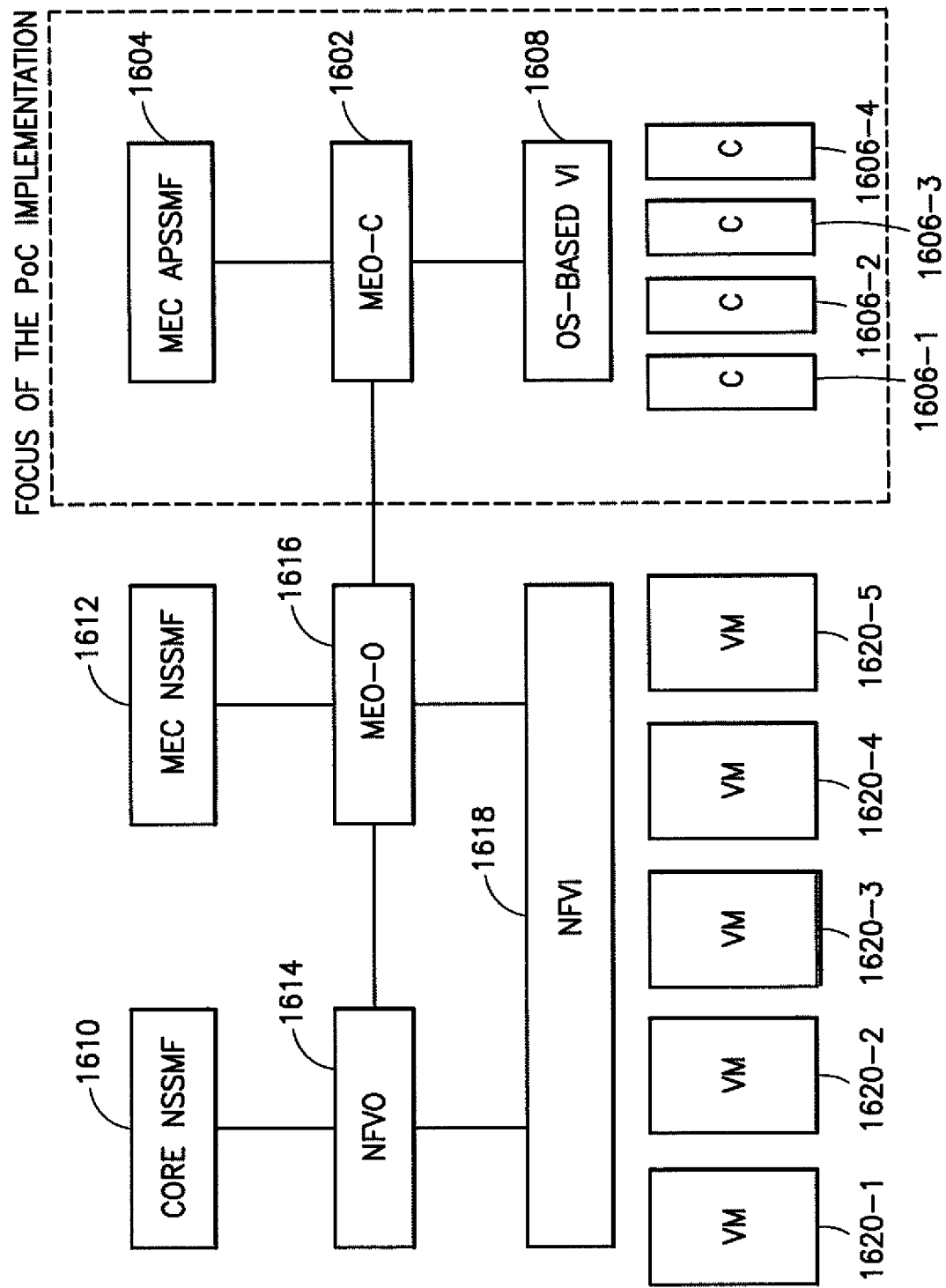
FIG. 16 is an illustration of the orchestration entities that are involved in the MEC domain.

The experience in implementing the management architecture provided by the exampled herein is also described. As shown in FIG. 16, several orchestration entities are involved in the management of the various application slice subnets. The focus is on implementing the MEC Customer Orchestrator 1602 using a popular open-source container orchestration platform. Further described in detail are the interfaces and data models needed to interact with the MEC APSSMF 1604, allowing the deployment of isolated MEC application slice subnets composed of ACFs in the form of Docker containers (1606-1, 1606-2, 1606-3, 1606-4).

Also shown in FIG. 16 is OS-based VI 1608 managed with MEO-C 1602, Core NSSMF 1610 which interfaces with NFVO 1614, and MES NSSMF 1612 which interfaces with MEO-O 1616. The NFVO 1614 interfaces with the MEO-O 1616 which interfaces with the MEO-C 1602. The NFVO 1614 and MEO-O 1616 both instantiate/manage the NFVI 1618. FIG. 16 also shows several virtual machines (VM) (1620-1, 1620-2, 1620-3, 1620-4, and 1620-5).

Figure 17:
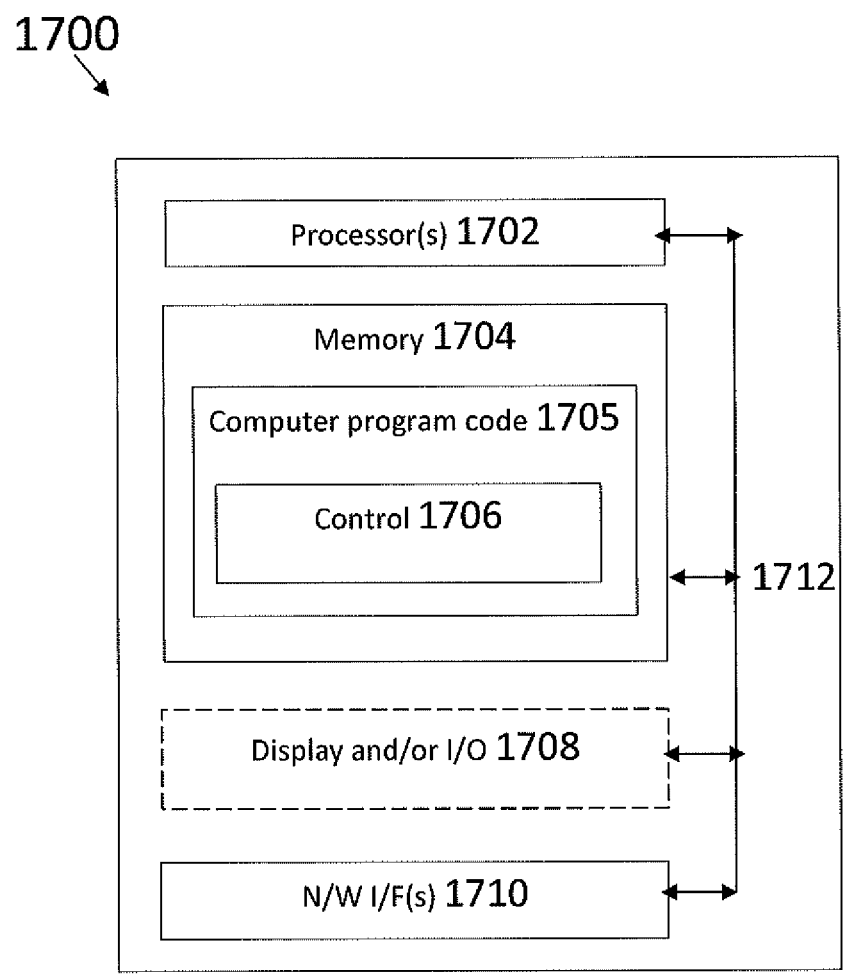
FIG. 17 is an example apparatus configured to implement the examples described herein.

FIG. 17 is an example apparatus 1700, which may be implemented in hardware, configured to implement the examples described herein. The apparatus 1700 comprises at least one processor 1702 (an FPGA and/or CPU), at least one memory 1704 including computer program code 1705, wherein at least one memory 1704 and the computer program code 1705 are configured to, with at least one processor 1702, cause the apparatus 1700 to implement circuitry, a process, component, module, or function (collectively control 1706) to implement the examples described herein, including multi-access edge computing slicing. The memory 1704 may be a non-transitory memory, a transitory memory, a volatile memory, or a non-volatile memory.

The apparatus 1700 optionally includes a display and/or I/O interface 1708 that may be used to display aspects or a status of the methods described herein (e.g., as one of the methods is being performed or at a subsequent time), or to receive input from a user such as with using a keypad. The apparatus 1700 includes one or more network (N/W) interfaces (I/F(s)) 1710. The N/W I/F(s) 1710 may be wired and/or wireless and communicate over the Internet/other network(s) via any communication technique. The N/W I/F(s) 1710 may comprise one or more transmitters and one or more receivers. The N/W I/F(s) 1710 may comprise standard well-known components such as an amplifier, filter, frequency-converter, (de)modulator, and encoder/decoder circuitries and one or more antennas.

The apparatus 1700 to implement the functionality of control 1706 may be UE 110, RAN node 170, or network element(s) 190. Thus, processor 1702 may correspond respectively to processor(s) 120, processor(s) 152 and/or processor(s) 175, memory 1704 may correspond respectively to memory(ies) 125, memory(ies) 155 and/or memory(ies) 171, computer program code 1705 may correspond respectively to computer program code 123, module 140-1, module 140-2, and/or computer program code 153, module 150-1, module 150-2, and/or computer program code 173, and N/W I/F(s) 1710 may correspond respectively to N/W I/F(s) 161 and/or N/W I/F(s) 180. Alternatively, apparatus 1700 may not correspond to either of UE 110, RAN node 170, or network element(s) 190, as apparatus 1700 may be part of a self-organizing/optimizing network (SON) node, such as in a cloud. Apparatus 1700 may correspond to any of the apparatuses shown in the other figures such as the MEC owner orchestrator 402, the MEC customer orchestrator 404, the ASMF 504, the UE 110, the web portal 524, the APSMF 506, or the APSSMF 430. The apparatus 1700 may also be distributed throughout the network 100 including within and between apparatus 1700 and any network element (such as a network control element (NCE) 190 and/or the RAN node 170 and/or the UE 110).

Interface 1712 enables data communication between the various items of apparatus 1700, as shown in FIG. 17. For example, the interface 1712 may be one or more buses such as address, data, or control buses, and may include any interconnection mechanism, such as a series of lines on a motherboard or integrated circuit, fiber optics or other optical communication equipment, and the like. Computer program code 1705, including control 1706 may comprise object-oriented software configured to pass data/messages between objects within computer program code 1705. The apparatus 1700 need not comprise each of the features mentioned, or may comprise other features as well.

Figure 18:
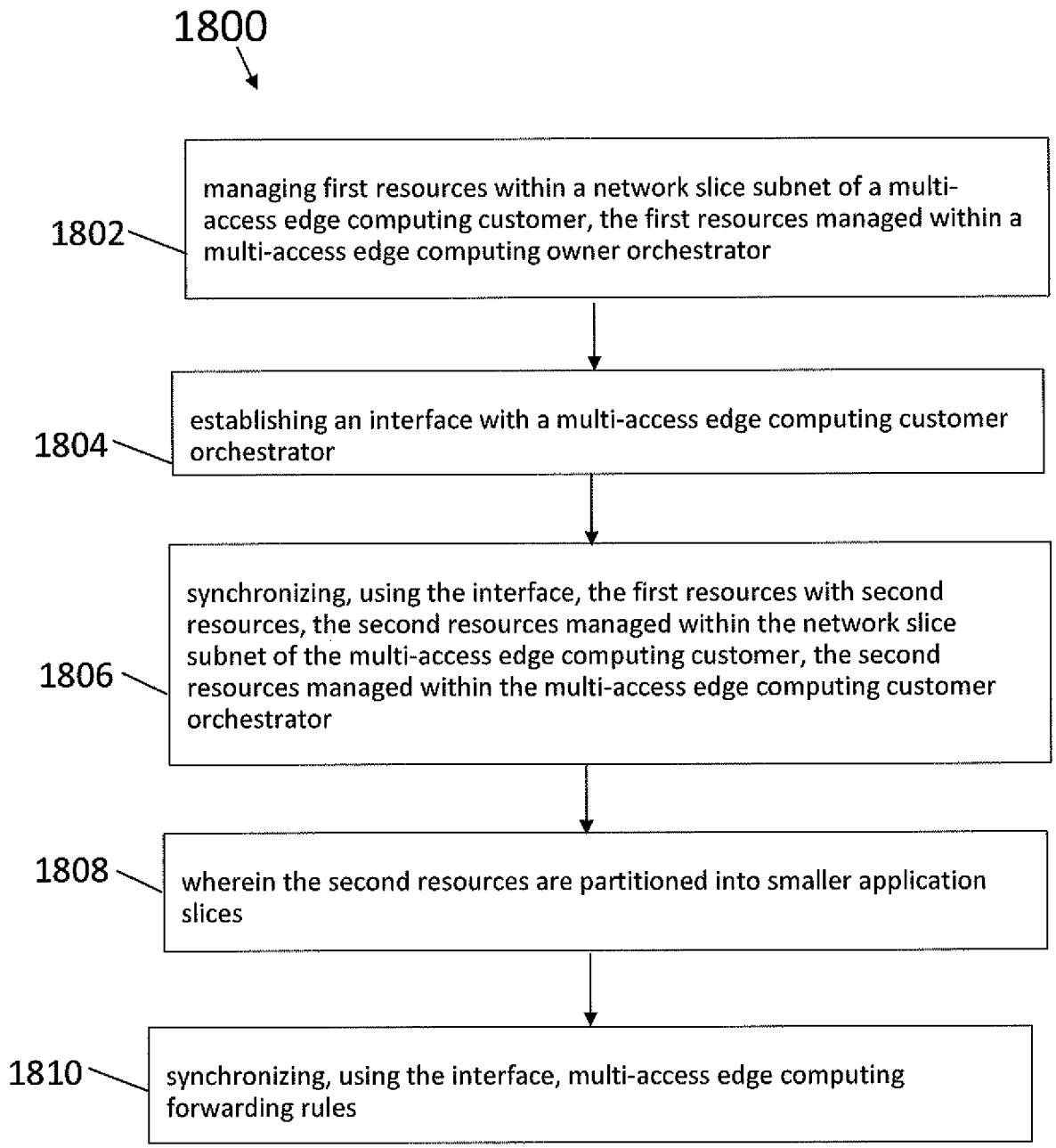
FIG. 18 is an example method performed with an MEC-OO to implement the examples described herein.

FIG. 18 is an example method 1800 to implement the example embodiments described herein. At 1802, the method includes managing first resources within a network slice subnet of a multi-access edge computing customer, the first resources managed within a multi-access edge computing owner orchestrator. At 1804, the method includes establishing an interface with a multi-access edge computing customer orchestrator. At 1806, the method includes synchronizing, using the interface, the first resources with second resources, the second resources managed within the network slice subnet of the multi-access edge computing customer, the second resources managed within the multi-access edge computing customer orchestrator. At 1808, the method includes wherein the second resources are partitioned into smaller application slices. At 1810, the method includes synchronizing, using the interface, multi-access edge computing forwarding rules. Method 1800 may be performed with an MEC-OO (e.g. 402).

Figure 19:
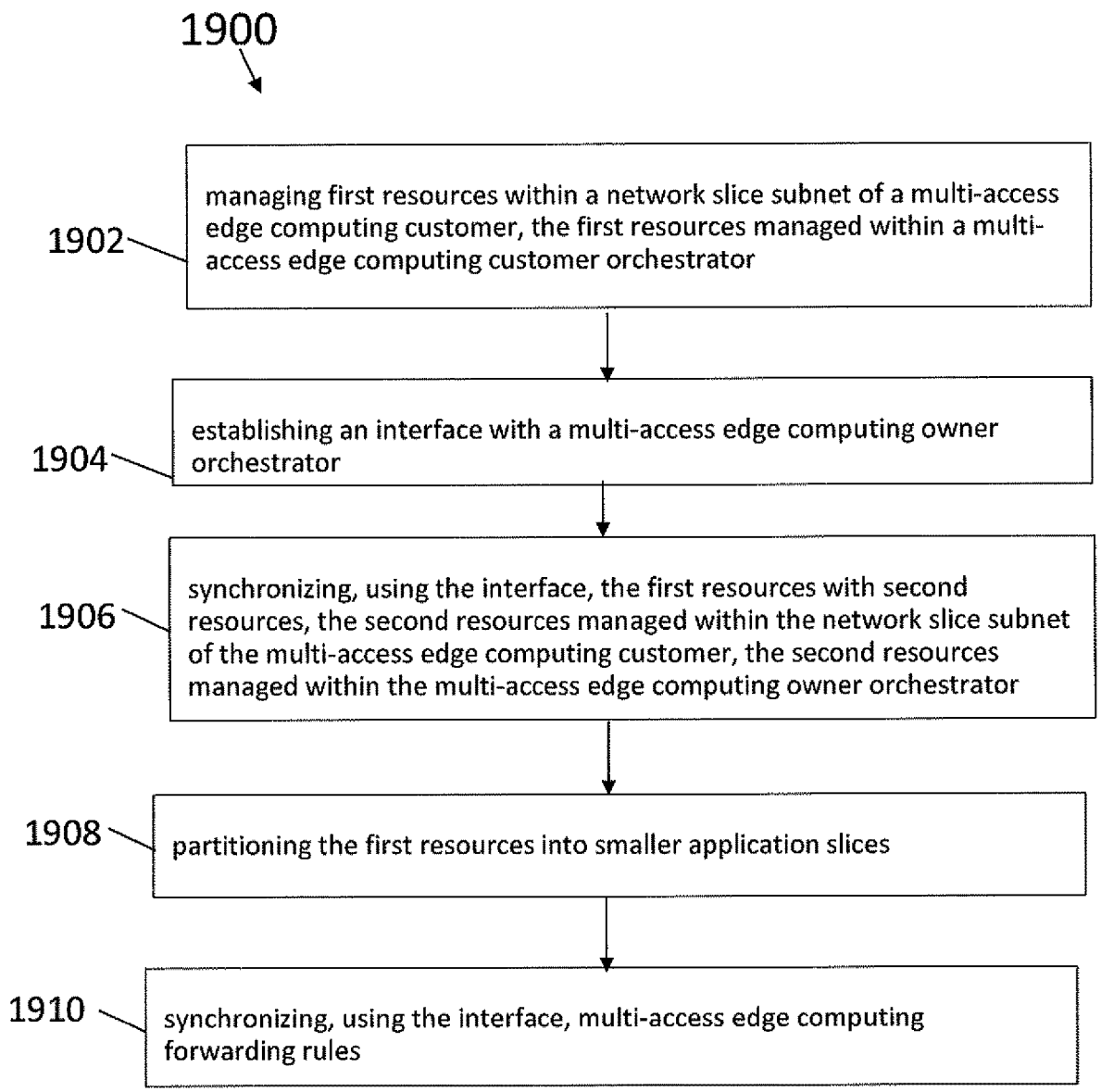
FIG. 19 is an example method performed with an MEC-CO to implement the examples described herein.

FIG. 19 is an example method 1900 to implement the example embodiments described herein. At 1902, the method includes managing first resources within a network slice subnet of a multi-access edge computing customer, the first resources managed within a multi-access edge computing customer orchestrator. At 1904, the method includes establishing an interface with a multi-access edge computing owner orchestrator. At 1906, the method includes synchronizing, using the interface, the first resources with second resources, the second resources managed within the network slice subnet of the multi-access edge computing customer, the second resources managed within the multi-access edge computing owner orchestrator. At 1908, the method includes partitioning the first resources into smaller application slices. At 1910, the method includes synchronizing, using the interface, multi-access edge computing forwarding rules. Method 1900 may be performed with an MEC-CO (e.g. 404).

Figure 20:
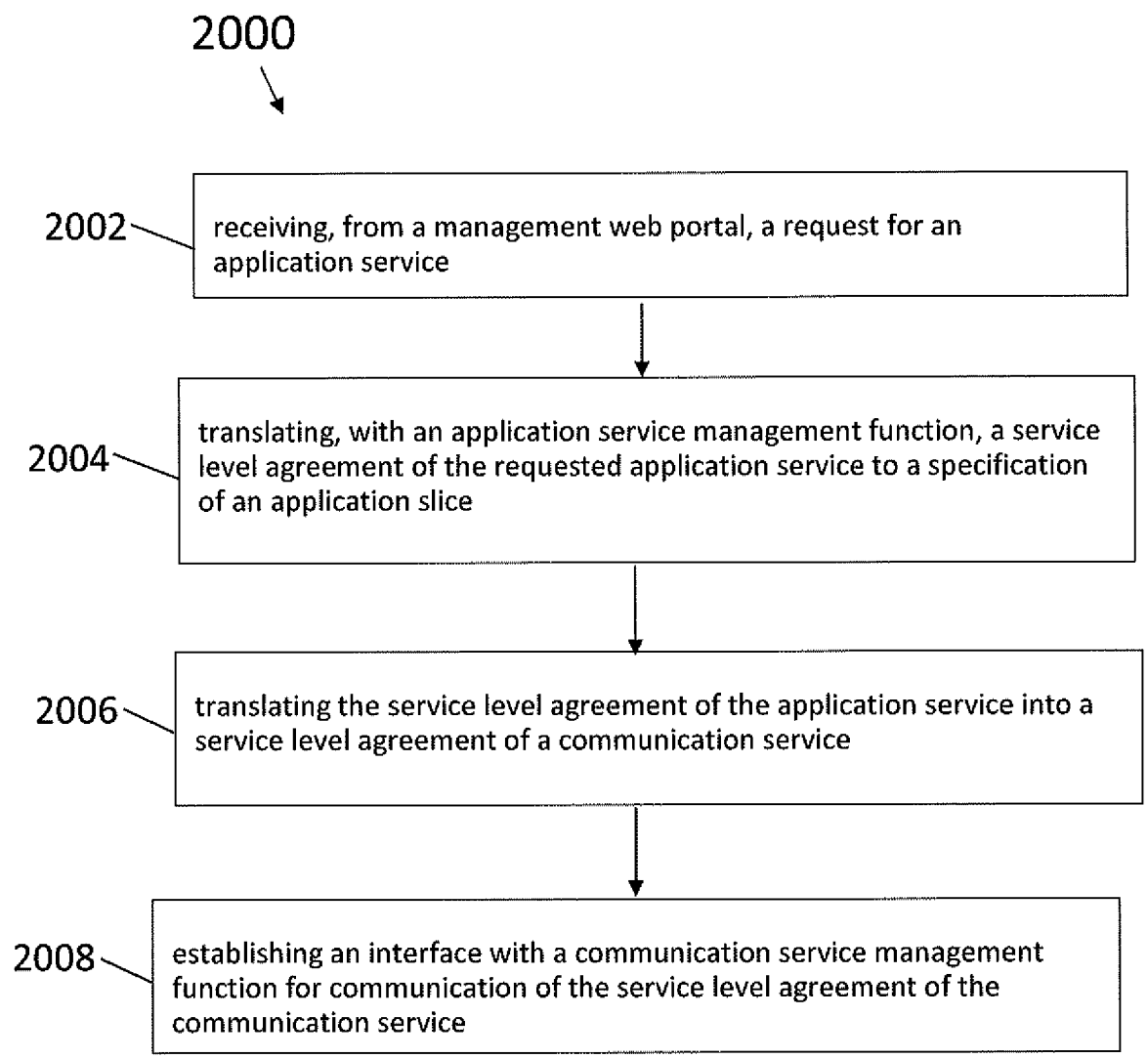
FIG. 20 is an example method performed with an ASMF to implement the examples described herein.

FIG. 20 is an example method 2000 to implement the example embodiments described herein. At 2002, the method includes receiving, from a management web portal, a request for an application service. At 2004, the method includes translating, with an application service management function, a service level agreement of the requested application service to a specification of an application slice.

At 2006, the method includes translating the service level agreement of the application service into a service level agreement of a communication service. At 2008, the method includes establishing an interface with a communication service management function for communication of the service level agreement of the communication service. Method 2000 may be performed with an ASMF (e.g. 504).

Figure 21:
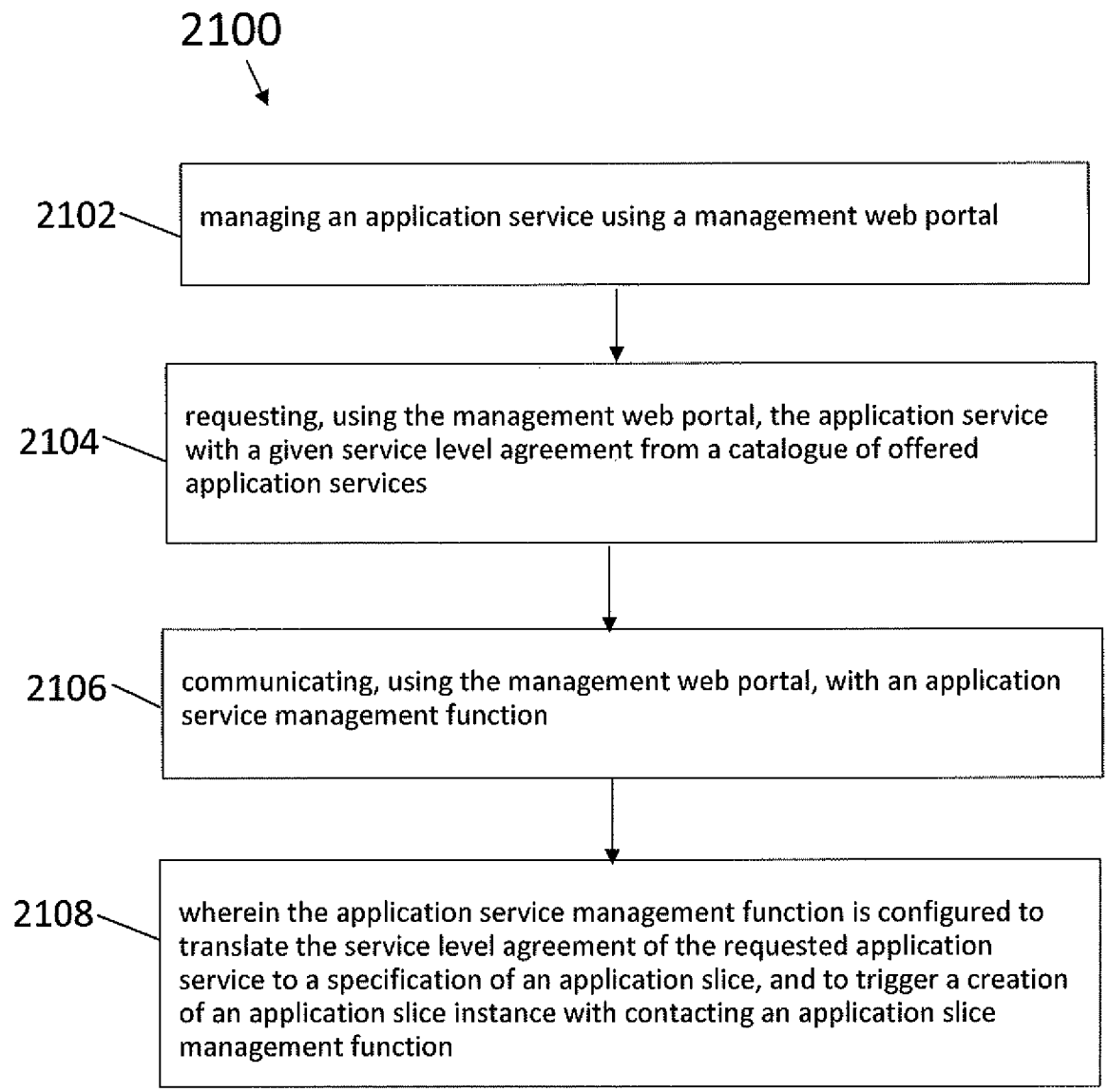
FIG. 21 is an example method performed with a UE/web portal to implement the examples described herein.

FIG. 21 is an example method 2100 to implement the example embodiments described herein. At 2102, the method includes managing an application service using a management web portal. At 2104, the method includes requesting, using the management web portal, the application service with a given service level agreement from a catalogue of offered application services. At 2106, the method includes communicating, using the management web portal, with an application service management function. At 2108, the method includes wherein the application service management function is configured to translate the service level agreement of the requested application service to a specification of an application slice, and to trigger a creation of an application slice instance with contacting an application slice management function. Method 2100 may be performed with a UE (e.g. 110) or web portal (e.g. 524).

Figure 22:
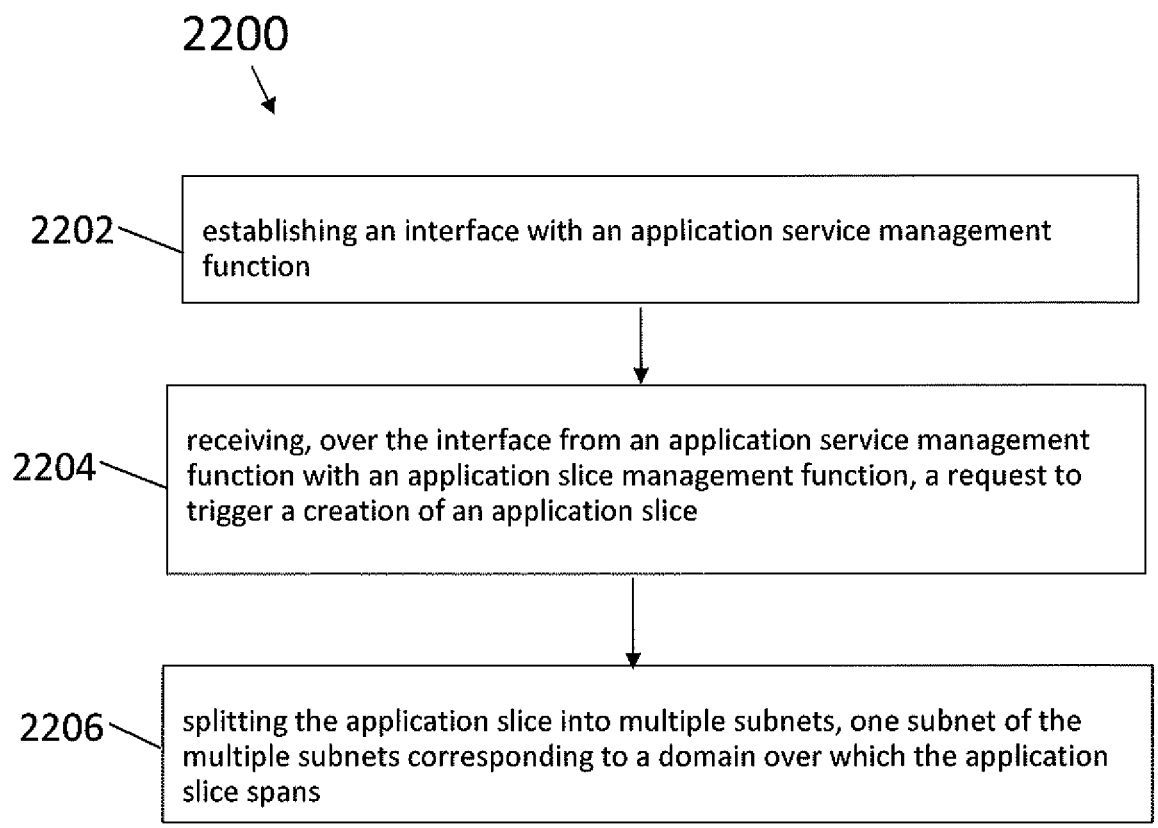
FIG. 22 is an example method performed with an APSMF to implement the examples described herein.

FIG. 22 is an example method 2200 to implement the example embodiments described herein. At 2202, the method includes establishing an interface with an application service management function. At 2204, the method includes receiving, over the interface from an application service management function with an application slice management function, a request to trigger a creation of an application slice. At 2206, the method includes splitting the application slice into multiple subnets, one subnet of the multiple subnets corresponding to a domain over which the application slice spans. Method 2200 may be performed with an APSMF (e.g. 506).

Figure 23:
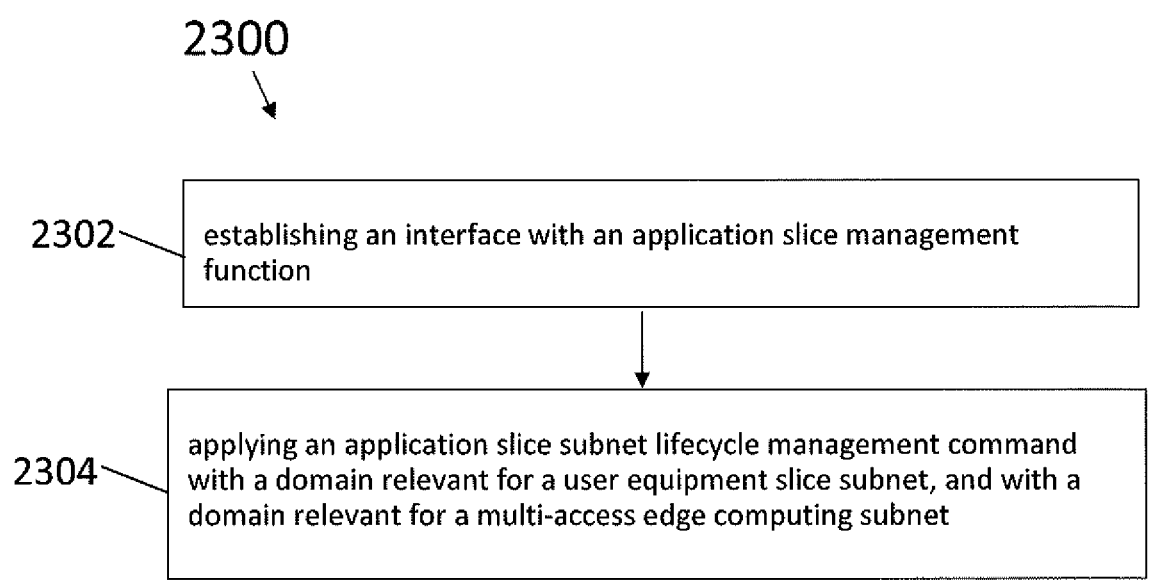
FIG. 23 is an example method performed with an APSSMF to implement the examples described herein.

FIG. 23 is an example method 2300 to implement the example embodiments described herein. At 2302, the method includes establishing an interface with an application slice management function. At 2304, the method includes applying an application slice subnet lifecycle management command with a domain relevant for a user equipment slice subnet, and with a domain relevant for a multi-access edge computing subnet. Method 2300 may be performed with an APSSMF (e.g. 430).

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The following examples (1-54) are provided and described herein.

Example 1: An example apparatus includes at least one processor; and at least one memory including computer program code; wherein the at least one memory and the computer program code are configured to, with the at least one processor, cause the apparatus at least to: manage first resources within a network slice subnet of a multi-access edge computing customer, the first resources managed within a multi-access edge computing owner orchestrator; establish an interface with a multi-access edge computing customer orchestrator; synchronize, using the interface, the first resources with second resources, the second resources managed within the network slice subnet of the multi-access edge computing customer, the second resources managed within the multi-access edge computing customer orchestrator; wherein the second resources are partitioned into smaller application slices; and synchronize, using the interface, multi-access edge computing forwarding rules.

Example 2: The apparatus of example 1, wherein the network slice subnet of the multi-access edge computing customer is managed with a network slice subnet management function of the multi-access edge computing customer.

Example 3: The apparatus of any one of examples 1 to 2, wherein an application slice of the smaller application slices is managed with an application slice management function of the multi-access edge computing customer.

Example 4: The apparatus of example 3, wherein the application slice management function is configured to delegate lifecycle management of constituent application slice subnets to a different domain application slice subnet management function.

Example 5: The apparatus of example 4, wherein the application slice subnet management function manages an application component function.

Example 6: The apparatus of any one of examples 1 to 5, wherein the at least one memory and the computer program code are further configured to, with the at least one processor, cause the apparatus at least to: receive an order from a multi-access edge computing network slice subnet management function to create, modify, or delete a multi-access edge computing network slice subnet.

Example 7: The apparatus of example 6, wherein the at least one memory and the computer program code are further configured to, with the at least one processor, cause the apparatus at least to: collaborate with a multi-access edge computing owner virtual environment orchestrator to manage a lifecycle of the multi-access edge computing network slice subnet.

Example 8: The apparatus of any one of examples 1 to 7, wherein the at least one memory and the computer program code are further configured to, with the at least one processor, cause the apparatus at least to: collaborate with a multi-access edge computing network slice manager to manage network slice subnet data plane parameters.

Example 9: The apparatus of example 8, wherein the at least one memory and the computer program code are further configured to, with the at least one processor, cause the apparatus at least to: establish an interface between the multi-access edge computing network slice subnet manager and a multi-access edge computing customer platform manager associated with the multi-access edge computing customer orchestrator.

Example 10: The apparatus of any one of examples 8 to 9, wherein the at least one memory and the computer program code are further configured to, with the at least one processor, cause the apparatus at least to: act as 3GPP Application Function (AF) and influence 3GPP (such as, for example, 5G or 6G) Core traffics from/towards application slices of the multi-access edge computing customer.

Example 11: The apparatus of any one of examples 8 to 10, wherein the at least one memory and the computer program code are further configured to, with the at least one processor, cause the apparatus at least to: synchronize, using an interface of a multi-access edge computing customer platform manager associated with the multi-access edge computing customer orchestrator, first 5G forwarding rules with second 5G forwarding rules; wherein the first 5G forwarding rules are associated with the collaboration with the multi-access edge computing network subnet slice manager to manage network slice subnet data plane parameters, and the second 5G forwarding rules are associated with the multi-access edge computing customer platform manager associated with the multi-access edge computing customer orchestrator.

Example 12: The apparatus of any one of examples 1 to 11, wherein the at least one memory and the computer program code are further configured to, with the at least one processor, cause the apparatus at least to: create a gateway to stitch a multi-access edge computing application slice data plane to a multi-access edge computing network slice subnet data plane; and communicate the gateway to the multi-access edge computing customer orchestrator.

Example 13: An apparatus includes at least one processor; and at least one memory including computer program code; wherein the at least one memory and the computer program code are configured to, with the at least one processor, cause the apparatus at least to: manage first resources within a network slice subnet of a multi-access edge computing customer, the first resources managed within a multi-access edge computing customer orchestrator; establish an interface with a multi-access edge computing owner orchestrator; synchronize, using the interface, the first resources with second resources, the second resources managed within the network slice subnet of the multi-access edge computing customer, the second resources managed within the multi-access edge computing owner orchestrator; partition the first resources into smaller application slices; and synchronize, using the interface, multi-access edge computing forwarding rules.

Example 14: The apparatus of example 13, wherein the network slice subnet of the multi-access edge computing customer is managed with a network slice subnet management function of the multi-access edge computing customer.

Example 15: The apparatus of any one of examples 13 to 14, wherein an application slice of the smaller application slices is managed with an application slice management function of the multi-access edge computing customer.

Example 16: The apparatus of example 15, wherein the application slice management function is configured to delegate lifecycle management of constituent application slice subnets to a different domain application slice subnet management function.

Example 17: The apparatus of example 16, wherein the application slice subnet management function manages an application component function.

Example 18: The apparatus of any one of examples 13 to 17, wherein the at least one memory and the computer program code are further configured to, with the at least one processor, cause the apparatus at least to: receive an order from a multi-access edge computing application slice subnet management function to create, modify, or delete a multi-access edge computing application slice of the smaller application slices.

Example 19: The apparatus of example 18, wherein the at least one memory and the computer program code are further configured to, with the at least one processor, cause the apparatus at least to: collaborate with a multi-access edge computing customer virtual environment orchestrator to manage a lifecycle of the multi-access edge computing application slice.

Example 20: The apparatus of any one of examples 13 to 19, wherein the at least one memory and the computer program code are further configured to, with the at least one processor, cause the apparatus at least to: collaborate with a multi-access edge computing customer platform manager to manage a multi-access edge computing platform instance.

Example 21: The apparatus of example 20, wherein the at least one memory and the computer program code are further configured to, with the at least one processor, cause the apparatus at least to: act as 3GPP Application Function (AF) and influence 3GPP (such as, for example, 5G or 6G) Core traffics from/towards application slices of the multi-access edge computing customer.

Example 22: The apparatus of any one of examples 20 to 21, wherein the at least one memory and the computer program code are further configured to, with the at least one processor, cause the apparatus at least to: establish an interface between the multi-access edge computing customer platform manager and a multi-access edge computing network slice subnet manager associated with the multi-access edge computing owner orchestrator.

Example 23: The apparatus of example 22, wherein the at least one memory and the computer program code are further configured to, with the at least one processor, cause the apparatus at least to: synchronize, using the interface between the multi-access edge computing customer platform manager and the multi-access edge computing network slice manager associated with the multi-access edge computing owner orchestrator, first 5G forwarding rules with second 5G forwarding rules; wherein the first 5G forwarding rules are associated with a collaboration with a multi-access edge computing network slice manager to manage network slice data plane parameters, and the second 5G forwarding rules are associated with a collaboration with a multi-access edge computing customer platform manager to manage a multi-access edge computing platform instance.

Example 24: The apparatus of any one of examples 13 to 23, wherein the at least one memory and the computer program code are further configured to, with the at least one processor, cause the apparatus at least to: receive a communication of a gateway from the multi-access edge computing owner orchestrator; wherein the gateway is configured to stitch a multi-access edge computing application slice data plane to a multi-access edge computing network slice data plane.

Example 25: An apparatus includes at least one processor; and at least one memory including computer program code; wherein the at least one memory and the computer program code are configured to, with the at least one processor, cause the apparatus at least to: receive, from a management web portal, a request for an application service; translate, with an application service management function, a service level agreement of the requested application service to a specification of an application slice; translate the service level agreement of the application service into a service level agreement of a communication service; and establish an interface with a communication service management function for communication of the service level agreement of the communication service.

Example 26: The apparatus of example 25, wherein the at least one memory and the computer program code are further configured to, with the at least one processor, cause the apparatus at least to: establish an interface with an application slice management function.

Example 27: The apparatus of any one of examples 25 to 26, wherein the management web portal is configured to partition the service level agreement into a first service level agreement and a second service level agreement, the first service level agreement being independent of the second service level agreement, the first service level agreement related to a communication service that the application service management function requests from a communication service management function, the second service level agreement dedicated to application service endpoints, the application service endpoints comprising a user equipment and a multi-access edge computing device.

Example 28: An apparatus includes at least one processor; and at least one memory including computer program code; wherein the at least one memory and the computer program code are configured to, with the at least one processor, cause the apparatus at least to: manage an application service using a management web portal; request, using the management web portal, the application service with a given service level agreement from a catalogue of offered application services; and communicate, using the management web portal, with an application service management function; wherein the application service management function is configured to translate the service level agreement of the requested application service to a specification of an application slice, and to trigger a creation of an application slice instance with contacting an application slice management function.

Example 29: The apparatus of example 28, wherein the at least one memory and the computer program code are further configured to, with the at least one processor, cause the apparatus at least to: manage at least one network service, the network service being related to the application service.

Example 30: The apparatus of any one of examples 28 to 29, wherein: the application slice instance is split with the application slice management function into multiple subnets, one subnet of the multiple subnets corresponding to a domain over which the application slice spans; and an application slice subnet management function applies an application slice subnet lifecycle management command with a domain relevant for a user equipment slice subnet, and with a domain relevant for a multi-access edge computing subnet.

Example 31: The apparatus of any one of examples 28 to 30, wherein the at least one memory and the computer program code are further configured to, with the at least one processor, cause the apparatus at least to: partition the service level agreement in into a first service level agreement and a second service level agreement, the first service level agreement being independent of the second service level agreement.

Example 32: An apparatus includes at least one processor; and at least one memory including computer program code; wherein the at least one memory and the computer program code are configured to, with the at least one processor, cause the apparatus at least to: establish an interface with an application service management function; receive, over the interface from an application service management function with an application slice management function, a request to trigger a creation of an application slice; and split the application slice into multiple subnets, one subnet of the multiple subnets corresponding to a domain over which the application slice spans.

Example 33: The apparatus of example 32, wherein the at least one memory and the computer program code are further configured to, with the at least one processor, cause the apparatus at least to: split the application slice into multiple subnets, one subnet of the multiple subnets corresponding to a domain over which the application slice spans.

Example 34: The apparatus of any one of examples 32 to 33, wherein the at least one memory and the computer program code are further configured to, with the at least one processor, cause the apparatus at least to: establish an interface with an application slice subnet management function.

Example 35: The apparatus of any one of examples 32 to 34, wherein the at least one memory and the computer program code are further configured to, with the at least one processor, cause the apparatus at least to: establish a second interface with a network slice management function; wherein the application slice management function is configured to communicate directly with the network slice management function over the second interface to manage network slice subnets associated with the application slice.

Example 36: An apparatus includes at least one processor; and at least one memory including computer program code; wherein the at least one memory and the computer program code are configured to, with the at least one processor, cause the apparatus at least to: establish an interface with an application slice management function; and apply an application slice subnet lifecycle management command with a domain relevant for a user equipment slice subnet, and with a domain relevant for a multi-access edge computing subnet.

Example 37: A method includes managing first resources within a network slice subnet of a multi-access edge computing customer, the first resources managed within a multi-access edge computing owner orchestrator; establishing an interface with a multi-access edge computing customer orchestrator; synchronizing, using the interface, the first resources with second resources, the second resources managed within the network slice subnet of the multi-access edge computing customer, the second resources managed within the multi-access edge computing customer orchestrator; wherein the second resources are partitioned into smaller application slices; and synchronizing, using the interface, multi-access edge computing forwarding rules.

Example 38: A method includes managing first resources within a network slice subnet of a multi-access edge computing customer, the first resources managed within a multi-access edge computing customer orchestrator; establishing an interface with a multi-access edge computing owner orchestrator; synchronizing, using the interface, the first resources with second resources, the second resources managed within the network slice subnet of the multi-access edge computing customer, the second resources managed within the multi-access edge computing owner orchestrator; partitioning the first resources into smaller application slices; and synchronizing, using the interface, multi-access edge computing forwarding rules.

Example 39: A method includes receiving, from a management web portal, a request for an application service; translating, with an application service management function, a service level agreement of the requested application service to a specification of an application slice; translating the service level agreement of the application service into a service level agreement of a communication service; and establishing an interface with a communication service management function for communication of the service level agreement of the communication service.

Example 40: A method includes managing an application service using a management web portal; requesting, using the management web portal, the application service with a given service level agreement from a catalogue of offered application services; and communicating, using the management web portal, with an application service management function; wherein the application service management function is configured to translate the service level agreement of the requested application service to a specification of an application slice, and to trigger a creation of an application slice instance with contacting an application slice management function.

Example 41: A method includes establishing an interface with an application service management function; receiving, over the interface from an application service management function with an application slice management function, a request to trigger a creation of an application slice; and splitting the application slice into multiple subnets, one subnet of the multiple subnets corresponding to a domain over which the application slice spans.

Example 42: A method includes establishing an interface with an application slice management function; and applying an application slice subnet lifecycle management command with a domain relevant for a user equipment slice subnet, and with a domain relevant for a multi-access edge computing subnet.

Example 43: A non-transitory program storage device readable by a machine, tangibly embodying a program of instructions executable with the machine for performing operations, the operations comprising: managing first resources within a network slice subnet of a multi-access edge computing customer, the first resources managed within a multi-access edge computing owner orchestrator; establishing an interface with a multi-access edge computing customer orchestrator; synchronizing, using the interface, the first resources with second resources, the second resources managed within the network slice subnet of the multi-access edge computing customer, the second resources managed within the multi-access edge computing customer orchestrator; wherein the second resources are partitioned into smaller application slices; and synchronizing, using the interface, multi-access edge computing forwarding rules.

Example 44: A non-transitory program storage device readable by a machine, tangibly embodying a program of instructions executable with the machine for performing operations, the operations comprising: managing first resources within a network slice subnet of a multi-access edge computing customer, the first resources managed within a multi-access edge computing customer orchestrator; establishing an interface with a multi-access edge computing owner orchestrator; synchronizing, using the interface, the first resources with second resources, the second resources managed within the network slice subnet of the multi-access edge computing customer, the second resources managed within the multi-access edge computing owner orchestrator; partitioning the first resources into smaller application slices; and synchronizing, using the interface, multi-access edge computing forwarding rules.

Example 45: A non-transitory program storage device readable by a machine, tangibly embodying a program of instructions executable with the machine for performing operations, the operations comprising: receiving, from a management web portal, a request for an application service; translating, with an application service management function, a service level agreement of the requested application service to a specification of an application slice; translating the service level agreement of the application service into a service level agreement of a communication service; and establishing an interface with a communication service management function for communication of the service level agreement of the communication service.

Example 46: A non-transitory program storage device readable by a machine, tangibly embodying a program of instructions executable with the machine for performing operations, the operations comprising: managing an application service using a management web portal; requesting, using the management web portal, the application service with a given service level agreement from a catalogue of offered application services; and communicating, using the management web portal, with an application service management function; wherein the application service management function is configured to translate the service level agreement of the requested application service to a specification of an application slice, and to trigger a creation of an application slice instance with contacting an application slice management function.

Example 47: A non-transitory program storage device readable by a machine, tangibly embodying a program of instructions executable with the machine for performing operations, the operations comprising: establishing an interface with an application service management function; receiving, over the interface from an application service management function with an application slice management function, a request to trigger a creation of an application slice; and splitting the application slice into multiple subnets, one subnet of the multiple subnets corresponding to a domain over which the application slice spans.

Example 48: A non-transitory program storage device readable by a machine, tangibly embodying a program of instructions executable with the machine for performing operations, the operations comprising: establishing an interface with an application slice management function; and applying an application slice subnet lifecycle management command with a domain relevant for a user equipment slice subnet, and with a domain relevant for a multi-access edge computing subnet.

Example 49: An apparatus includes means for managing first resources within a network slice subnet of a multi-access edge computing customer, the first resources managed within a multi-access edge computing owner orchestrator; means for establishing an interface with a multi-access edge computing customer orchestrator; means for synchronizing, using the interface, the first resources with second resources, the second resources managed within the network slice subnet of the multi-access edge computing customer, the second resources managed within the multi-access edge computing customer orchestrator; wherein the second resources are partitioned into smaller application slices; and means for synchronizing, using the interface, multi-access edge computing forwarding rules.

Example 50: An apparatus includes means for managing first resources within a network slice subnet of a multi-access edge computing customer, the first resources managed within a multi-access edge computing customer orchestrator; means for establishing an interface with a multi-access edge computing owner orchestrator; means for synchronizing, using the interface, the first resources with second resources, the second resources managed within the network slice subnet of the multi-access edge computing customer, the second resources managed within the multi-access edge computing owner orchestrator; means for partitioning the first resources into smaller application slices; and means for synchronizing, using the interface, multi-access edge computing forwarding rules.

Example 51: An apparatus includes means for receiving, from a management web portal, a request for an application service; means for translating, with an application service management function, a service level agreement of the requested application service to a specification of an application slice; means for translating the service level agreement of the application service into a service level agreement of a communication service; and means for establishing an interface with a communication service management function for communication of the service level agreement of the communication service.

Example 52: An apparatus includes means for managing an application service using a management web portal; means for requesting, using the management web portal, the application service with a given service level agreement from a catalogue of offered application services; and means for communicating, using the management web portal, with an application service management function; wherein the application service management function is configured to translate the service level agreement of the requested application service to a specification of an application slice, and to trigger a creation of an application slice instance with contacting an application slice management function.

Example 53: An apparatus includes means for establishing an interface with an application service management function; means for receiving, over the interface from an application service management function with an application slice management function, a request to trigger a creation of an application slice; and means for splitting the application slice into multiple subnets, one subnet of the multiple subnets corresponding to a domain over which the application slice spans.

Example 54: An apparatus includes means for establishing an interface with an application slice management function; and means for applying an application slice subnet lifecycle management command with a domain relevant for a user equipment slice subnet, and with a domain relevant for a multi-access edge computing subnet.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, this description is intended to embrace all such alternatives, modifications and variances which fall within the scope of the appended claims.

The following acronyms and abbreviations that may be found in the specification and/or the drawing figures are defined as follows (the abbreviations and acronyms may be appended with each other or with other characters using e.g. a dash or hyphen):

3GPP third generation partnership project
4G fourth generation
5G fifth generation
5GC 5G core network
ACF application component function
AMF access and mobility management function
API application programming interface
app application
APS application slice
APSMF application slice management function
APSS application slice subnet
APSSMF application slice subnet management function
AS application service
ASC application service consumer
ASIC application-specific integrated circuit
ASMF application service management function
ASP application service provider
CFS customer facing service
CS communication service
CSMF communication service management function
CN core network
CPU central processing unit
CU central unit or centralized unit
DC dual connectivity
D-plane data plane
DSP digital signal processor
DU distributed unit
E2E end to end
EP AS SLA endpoint-related application service SLA
eNB evolved Node B (e.g., an LTE base station)
EN-DC E-UTRA-NR dual connectivity
en-gNB node providing NR user plane and control plane protocol terminations towards the UE, and acting as a secondary node in EN-DC
etcd "/etc distributed", distributed key-value store
ETSI European Telecommunications Standards Institute
E-UTRA evolved universal terrestrial radio access, i.e., the LTE radio access technology
F1 interface between the CU and the DU
FPGA field-programmable gate array
gNB base station for 5G/NR, i.e., a node providing NR user plane and control plane protocol terminations towards the UE, and connected via the NG interface to the 5GC
ID identifier
I/F interface
I/O input/output
K8 Kubernetes
LCM lifecycle management
LMF location management function
LTE long term evolution (4G)
MAC medium access control
MEAO MEC application orchestrator
MEC multi-access edge computing
MEC-CO MEC customer orchestrator
MEC-CVEO MEC customer VEO
MECO MEC customer orchestrator
MEC-OO MEC owner orchestrator
MEC-OVEO MEC owner VEO MECPM MEC platform manager, or MEC customer platform manager
MENSM MEC network slice manager
MEO MEC orchestrator
MEOO MEC owner orchestrator
MEP MEC platform
MEPM MEC platform manager
MEPM-V MEC platform manager-NFV
MME mobility management entity
MOP MEC operator
NCE network control element
NF network function
NFV network function virtualization
NFVI NFV infrastructure
ng or NG new generation
ng-eNB new generation eNB
NG-RAN new generation radio access network
NR new radio (5G)
NS network slice
NSMF network slice management function
NSS network slice subnet
NSSMF network slice subnet management function
NST network slice template
N/W or NW network
OS operating system
PDA personal digital assistant
PDCP packet data convergence protocol
PHY physical layer
PNF physical network function
QoS quality of service
RAN radio access network
RLC radio link control
RRC radio resource control (protocol)
RRH remote radio head
RU radio unit
Rx receiver or reception
SGW serving gateway
SLA service level agreement
SON self-organizing/optimizing network
TN transport network
TRP transmission and/or reception point
TS technical specification
Tx transmitter or transmission
UE user equipment (e.g., a wireless, typically mobile device)
UPF user plane function
VEO virtual environment orchestrator—e.g. OpenStack Heat, Kubernetes, etc.
VI virtualization infrastructure
VNF virtualized/virtual network function
VNFM VNF LCM manager
X2 network interface between RAN nodes and between RAN and the core network
Xn or XN network interface between NG-RAN nodes

What is claimed is:

1. An apparatus comprising:
at least one processor; and
at least one non-transitory memory storing instructions that, when executed by the at least one processor, cause the apparatus at least to:
manage an application service using a management web portal;
request, using the management web portal, the application service with a given service level agreement from a catalogue of offered application services; and
communicate, using the management web portal, with an application service management function;
wherein the application service management function is configured to translate the service level agreement of the requested application service to a specification of an application slice, and to trigger a creation of an application slice instance by contacting an application slice management function.

2. The apparatus of claim 1, wherein the instructions, when executed by the at least one processor, cause the apparatus at least to:
manage at least one communication service, the communication service being related to the application service.

3. The apparatus of claim 1, wherein:
the application slice instance is split with the application slice management function into multiple subnets, one subnet of the multiple subnets corresponding to a domain over which the application slice spans; and
an application slice subnet management function applies an application slice subnet lifecycle management command with a domain relevant for a user equipment slice subnet, and with a domain relevant for a multi-access edge computing subnet.

4. The apparatus of claim 3, wherein the domain over which the application slice spans comprises at least one of:
a network,
an application service endpoint comprising a user equipment requesting the application service, or
an application service endpoint comprising an edge computing instantiating the application service.

5. The apparatus of claim 1, wherein the instructions, when executed by the at least one processor, cause the apparatus at least to:
partition the service level agreement into a first service level agreement and a second service level agreement, the first service level agreement being independent of the second service level agreement, wherein the service level agreement comprises a global application service level agreement of an end-user.

6. The apparatus of claim 5, wherein:
the first service level agreement is related to an end-to-end communication service requested with the application service management function from a communication service management function, and
the second service level agreement comprises an endpoint related application service service level agreement.

7. The apparatus of claim 1, wherein the application service management function is configured to translate the service level agreement associated with the application service into a service level agreement associated with a communication service.

8. The apparatus of claim 7, wherein the application service management function is configured to request the communication service from a communication service management function.

9. The apparatus of claim 1, wherein the instructions, when executed by the at least one processor, cause the apparatus at least to:
provide an interface for slice management with a communication service management function.

10. The apparatus of claim 9, wherein the instructions, when executed by the at least one processor, cause the apparatus at least to:
request, with the web portal, creation of a network slice using a network slice template provided with the communication service management function.

11. The apparatus of claim 1, further comprising:
an interface between the application slice management function and a multi-access edge computing application slice subnet management function, wherein the multi-access edge computing application slice subnet management function is configured to apply a lifecycle management command within a domain for at least one application slice subnet; and another interface between the application slice management function and a user equipment application slice subnet management function, wherein the user equipment application slice subnet management function is configured to apply a lifecycle management command within another domain for at the at least one other application slice subnet.

12. The apparatus of claim 1, wherein the instructions, when executed by the at least one processor, cause the apparatus at least to:

manage first resources within a network slice subnet of a multi-access edge computing customer, the first resources managed within a multi-access edge computing owner orchestrator; and establish an interface with a multi-access edge computing customer orchestrator;

synchronize, using the interface, the first resources with second resources, the second resources managed within the network slice subnet of the multi-access edge computing customer, the second resources managed within the multi-access edge computing customer orchestrator;

wherein the second resources are partitioned into smaller application slices; and synchronize, using the interface, multi-access edge computing forwarding rules.

13. The apparatus of claim 12, wherein an application slice of the smaller application slices is managed with a multi-access edge computing customer application slice management function of the multi-access edge computing customer.

14. The apparatus of claim 13, wherein the multi-access edge computing customer application slice management function is configured to delegate lifecycle management of constituent application slice subnets to a different domain application slice subnet management function.

15. The apparatus of claim 12, wherein the network slice subnet of the multi-access edge computing customer is managed with a network slice subnet management function of the multi-access edge computing customer.

16. The apparatus of claim 1, wherein the instructions, when executed by the at least one processor, cause the apparatus at least to:

manage first resources within a network slice subnet of a multi-access edge computing customer, the first resources managed within a multi-access edge computing customer orchestrator;

establish an interface with a multi-access edge computing owner orchestrator;

synchronize, using the interface, the first resources with second resources, the second resources managed within the network slice subnet of the multi-access edge computing customer, the second resources managed within the multi-access edge computing owner orchestrator;

partition the first resources into smaller application slices; and synchronize, using the interface, multi-access edge computing forwarding rules.

17. The apparatus of claim 16, wherein the network slice subnet of the multi-access edge computing customer is managed with a network slice subnet management function of the multi-access edge computing customer.

18. The apparatus of claim 16, wherein an application slice of the smaller application slices is managed with an application slice management function of the multi-access edge computing customer.

19. A method comprising:

managing an application service using a management web portal;

requesting, using the management web portal, the application service with a given service level agreement from a catalogue of offered application services; and communicating, using the management web portal, with an application service management function;

wherein the application service management function is configured to translate the service level agreement of the requested application service to a specification of an application slice, and to trigger a creation of an application slice instance by contacting an application slice management function.

20. A non-transitory program storage device readable by a machine, tangibly embodying a program of instructions executable with the machine for performing operations, the operations comprising:

managing an application service using a management web portal;

requesting, using the management web portal, the application service with a given service level agreement from a catalogue of offered application services; and communicating, using the management web portal, with an application service management function;

wherein the application service management function is configured to translate the service level agreement of the requested application service to a specification of an application slice, and to trigger a creation of an application slice instance by contacting an application slice management function.

* * * * *